United States Patent [19]
Houlberg

[11] Patent Number: 6,072,571
[45] Date of Patent: Jun. 6, 2000

[54] COMPUTER CONTROLLED OPTICAL TRACKING SYSTEM

[75] Inventor: Christian L. Houlberg, Ventura, Calif.

[73] Assignee: The United States of America as represented by the Secretary of the Navy, Washington, D.C.

[21] Appl. No.: 09/017,545

[22] Filed: Jan. 20, 1998

Related U.S. Application Data

[63] Continuation-in-part of application No. 08/641,131, Apr. 22, 1996, Pat. No. 5,726,747.

[51] Int. Cl.[7] .................................. H04N 7/18; F41G 1/00
[52] U.S. Cl. ................................ 356/139.04; 356/139.05; 356/139.06; 348/169; 348/144; 250/203.1
[58] Field of Search ......................... 356/139.04, 139.05, 356/139.06; 348/144, 152, 153, 164, 169; 250/203.1, 203.3

[56] References Cited

U.S. PATENT DOCUMENTS 5,726,747  3/1998  Houlberg ........................... 356/139.04

*Primary Examiner*—Joseph L. Felber
*Attorney, Agent, or Firm*—David Kalmbaugh

[57] ABSTRACT

A system for tracking a target comprises an acquisition sight used by a pilot of an aircraft to acquire and begin tracking the target. Once the pilot acquires the target an operator can use a track handle to track the target. The operator monitors the target utilizing narrow and wide field of view monitors. A computer receives azimuth and elevation data from the tracking device which may be the acquisition sight, track handle, a video tracking system or a tracking radar coupled to an infrared display system. The computer then processes the azimuth and elevation data and provides azimuth and elevation angle signals to a gimbal mirror interface which steers the gimballed mirror to the target. The gimballed mirror receives image forming light from the target and then directs the image forming light to a wide field of view camera and a zoom telescope. The wide field of view camera is connected to the wide field of view monitor to display the target on the wide field of view monitor. The zoom telescope provides a narrow field of view image which is directed to a narrow field of view camera which is connected to the narrow field of view monitor allowing the narrow field of view image of the target to be displayed. The airborne video tracking system also provides for the automatic calibration of the gimballed mirror, the acquisition sight and the infrared display system.

22 Claims, 19 Drawing Sheets

6,072,571

COMPUTER CONTROLLED OPTICAL TRACKING SYSTEM

This application is a continuation-in-part of U.S. Pat. application Ser. No. 08/641,131, filed Apr. 22, 1996 now U.S. Pat. No. 5,726,747.

BACKGROUND OF THE INVENTION

1. Field of the Invention

The present invention relates generally to tracking systems. More specifically, the present invention relates to an optical tracking system which is computer controlled and which is adapted for use on board an airborne platform such as aircraft, helicopter or the like.

2. Description of the Prior Art

In the past optical tracking systems have been extensively used for acquiring, locating, and tracking objects of interest from an airborne platform. For example, in tracking the movement of illegal drugs via an airborne vehicle, such as helicopter 37 of FIG. 2, or a land based vehicle from the air, an optical tracking system on board a helicopter can be extremely useful in that it continually provides updated information as to the movement, direction and location of the vehicle. By accurately identifying the movement, direction and location of the vehicle to law enforcement personnel on the ground an arrest can be made without undue endangerment to the individuals making the arrest.

An airborne optical tracking system can also be extremely useful in tracking illegal aliens entering the United States across its many borders which cover several hundred miles of rugged terrain and which are not easily accessible by land. Other uses for an airborne optical tracking system include search and rescue missions at sea and on land where the terrain is very rugged.

Generally, an optical tracking system for an airborne platform utilizing video cameras is referred to as an Airborne Video Tracking System (AVTS). These Airborne Video Tracking Systems are often manually controlled by either the pilot of the aircraft or a crew member. However, optical tracking systems which are manually controlled often lack the ability to quickly acquire a target. In addition, the manually controlled airborne optical tracking systems are generally unable to steer the optics to point to a specific latitude and longitude for the target in a rapid response time or to slave the optics of the optical tracking system with another tracking system and thereby follow the other tracking system. Such a tracking system may be an acquisition sight tracking system or an infrared or radar tracking system.

It is therefore an object of the present invention to provide an airborne tracking system which allows for the immediate acquisition of a target of interest by the user of the system.

It is another object of the present invention to provide instantaneous location including longitude and latitude coordinates for the target of interest.

It is still another object of the present invention to provide an airborne optical tracking system which may slaved with another tracking system so as to follow the other tracking system.

Various other advantages and objectives of the present invention will become apparent to those skilled in the art by the detailed description of the invention and its preferred embodiments.

SUMMARY OF THE INVENTION

The present invention overcomes some of the disadvantages mentioned above in that it comprises a highly accurate and reliable airborne video tracking system for use in tracking a target of interest and then providing instantaneous location information including the longitude, latitude and altitude for the target.

The airborne video tracking system comprises an acquisition sight for use by a pilot of an aircraft to acquire and begin tracking the target. Once the pilot acquires the target an operator at an operator's console in the aircraft can use a track handle to manually take control of tracking the target from the pilot. The operator monitors the target utilizing a narrow field of view monitor and a wide field of view monitor located at the operator's console. When the target is visible within the narrow field of monitor the operator can switch tracking of the target from the track handle to an automatic video tracking system. The automatic video tracking system tracks the target based upon the contrast between the target and its surroundings.

An airborne video tracking system computer receives azimuth and elevation positional signals from the tracking device being used to track the target. The tracking device may be the acquisition sight, the track handle, the automatic video tracking system or a tracking radar which is coupled to an infrared display system. The airborne video tracking system computer then processes the azimuth and elevation data from the tracking device and provides azimuth and elevation angle signals in an analog format to a gimballed mirror to steer the gimballed mirror to the target.

The gimballed mirror receives image forming light from the target and then directs the image forming light via a first turning mirror to a wide field of view camera and a zoom telescope. The wide field of view camera is connected to the wide field of view monitor via the airborne video tracking system computer at the operator's console allowing a wide field of view image to be displayed to the operator at the operator's console.

The zoom telescope, which also receives image forming light from the gimballed mirror via a second turning mirror, provides a narrow field of view image ranging from about 0.1 degree to about one degree. The zoom telescope directs a narrow field of view image to a narrow field of view camera. The narrow field of view camera is connected to the narrow field of view monitor via the airborne video tracking system computer at the operator's console allowing the narrow field of view image of the target to be displayed to the operator at the operator's console.

The computer includes a video time inserter/video data inserter which overlays time and positional information of the target on the narrow field of view display. The video time inserter/video data inserter also overlays time and positional information of the aircraft as well as positional indicators of the gimballed mirror on the wide field of view display.

The airborne video tracking system also provides for automatic calibration of analog signals (azimuth and elevation angles) received by the computer from the gimballed mirror which indicate the direction the gimballed mirror is pointing. The automatic calibration of analog signals supplied to the gimballed mirror by the computer to steer the gimballed mirror is provided for by the computer of the airborne video tracking system. In addition, automatic calibration of the acquisition sight and the infrared display system is also provided for by the computer of the airborne video tracking system.

The target location may be determined by triangulating target locations with the F9 key on the computer's keyboard with weight applied to each line of sight vector used in the triangulation calculation being equal. The target location may also be determined by marking the target location. The target locations are averaged with previous target locations by holding down the F10 key on the computer's keyboard which improves the accuracy of the location calculated for the marked target.

The target location when determined by marking or triangulation, is saved in a Cue Point buffer. The gimballed mirror is steered to the last triangulated or marked target by depressing the F5 key on the computer's keyboard.

The airborne video tracking system may also track vehicles with a predetermined flight path such as missile's launch trajectory or the flight path of a satellite. The location of marked and triangulated targets are output to a moving map display using the National Marine Electronics Association 0183 protocol.

DETAILED DESCRIPTION OF THE PREFERRED EMBODIMENT

Figure 1:
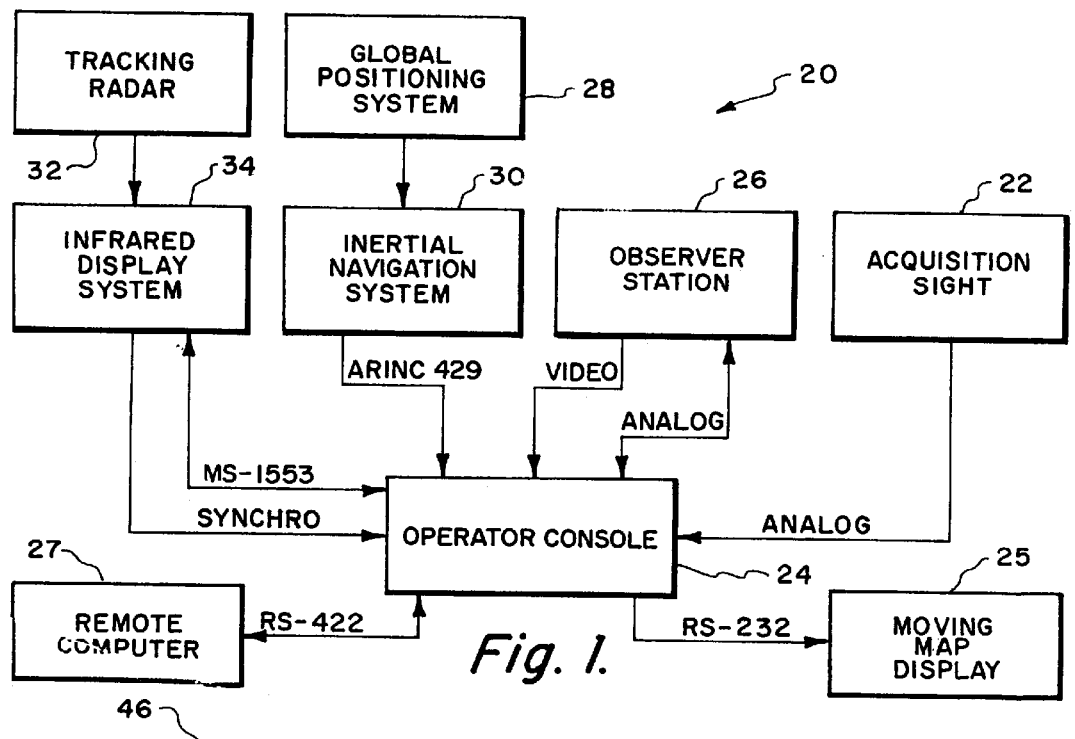
FIG. 1 is a simplified block diagram of the airborne tracking system constituting the present invention.

Referring to FIG. 1 there is shown a simplified block diagram of the airborne video tracking system 20 which is adapted for use on board an aircraft or helicopter or the like. Airborne video tracking system 20 includes an observer station 26 and an operator console 24. The operator console 24 is connected to observer station 26 which includes the optical tracking elements illustrated in FIG. 2 for airborne video tracking system 20. The operator console 24 is also connected to an acquisition sight 22 which is generally located in the aircraft's cockpit and which is used by the aircraft's pilot for the initial acquisition of the target when airborne video tracking system 20 is being used to track a target such as the helicopter 37 illustrated in FIG. 2.

Figure 2:
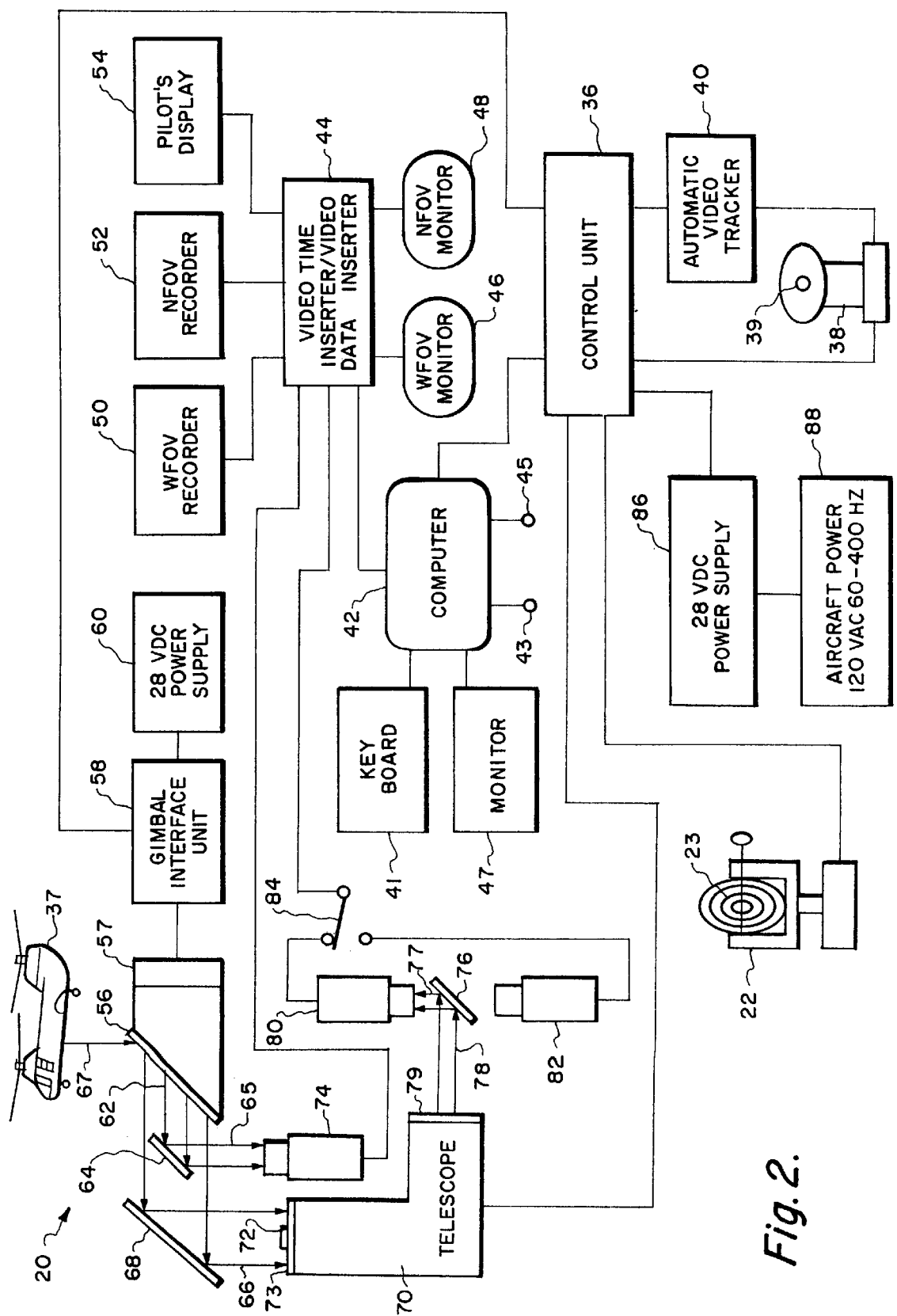
FIG. 2 is a detailed schematic diagram of the airborne tracking system of the present invention.

Although target 37 is depicted as a helicopter in FIG. 2, it should be understood that tracking system 20 is also used to track land based targets such as trucks and automobiles and ocean going vehicles such as cargo ships and small pleasure craft. Tracking system 20 can also track a vehicle which has a predetermined flight path such as a missile, space shuttle or a satellite.

Tracking system 20 is currently installed on the P3 aircraft which functions as its platform. The P3 aircraft may include a moving map display 25 which is coupled to computer 42 at operator console 24 by an RS-232 data bus. Moving map display 25 is generally used in P3 aircraft which monitor the illegal movement of drugs. The NMEA-0183 protocol (National Marine Electronics Association) is the protocol for moving map display 25.

The P3 aircraft may also include a remote computer 27 which is coupled to operator console 24 by an RS-422 data bus. Operator console 24 provides the remote computer 27 with positional and directional information such as latitude, longitude, altitude, roll, pitch and heading. Remote computer 27 may also be adapted to acquire and store each frame of video data provided by wide field of view camera 74 (FIG. 2) and narrow field of view cameras 80 and 82 (FIG. 2) for transmission to a remote receiving station.

Referring to FIGS. 1 and 2, the acquisition sight 22 used in the present invention is a newton ring type acquisition sight wherein the aircraft's pilot looks through a glass lens which includes a circle or newton ring 23 projected to infinity. The pilot then aligns circle 23 of acquisition sight 22 with the target 37 such that the target 37 appears within circle 23 of acquisition sight 22 thereby providing for the initial acquisition of the target 37 by airborne video tracking system 20. Acquisition sights 22 then provides an analog signal (indicating azimuth and elevation of the target) to a system computer 42 (FIG. 2) located at the operator console 24. The system computer 42 processes the analog signal and then provides control signals to position the optics at the observer station 26 to the target 37.

Operator console 24 is also coupled to the aircraft's inertial navigation system 30 allowing system computer 42 to monitor the location of the aircraft having airborne video tracking system mounted therein. Positional information provided by the aircraft's inertial navigation system 30 includes the aircraft's latitude and longitude coordinates and the aircraft's elevation as well as the roll, pitch and heading of the aircraft. The inertial navigation system 30 is, in turn, connected to a global positioning system 28 located on board the aircraft. The global positioning system 28 provides position information updates to the aircraft's inertial navigation system 30 to correct for drifting which occurs in the inertial navigation system 30 after takeoff of the aircraft.

The operator console 24 is connected to the aircraft's infrared display system 34 to receive synchro/sinusoidal signals from system 34 which indicate the direction infrared display system 34 is pointing. Infrared display system 34 is coupled to a tracking radar 32 which can be used to guide infrared display system 34. Interfacing with the aircraft's infrared display system 34 allows an operator the ability to monitor the aircraft's tracking radar from operator console 24.

Tracking system 20 may also have an MS-1553 multiplex data bus which couples infrared display system 34 to operator console 24. The MS-1553 multiplex data bus allows the operator of system 20 to point infrared display system 34 at a target 37. Whenever infrared display system 34 is a Forward Looking Infrared Display an MS-1553 multiplex data bus is required to steer and point system 34 at a target.

Operator console 24 includes computer 42 which may be, for example, any IBM compatible PC computer. Connected to computer 42 is a keyboard 41 and a monitor 47. There is also a track handle 38 at operators console 24 which is connected to computer 42 through an automatic video tracker 40 and a control unit 36. Track handle 38 allows an operator at console 24 to manually track the target 37 by depressing trigger switch 39 on track handle 38 once the aircraft's pilot acquires the target 37 using acquisition sight 22. The operator monitors the target 37 at the wide field of view monitor 46 which is located at operators console 24.

By engaging a trigger switch 39 at the operator console 24, the operator takes control of tracking target 37 from the pilot using automatic video tracker 40 or track handle 38. When target 37 is within the narrow field of view as displayed on monitor 48, the operator at operator console 24 can switch to automatic video tracker 40 as the means for tracking target 37. The automatic video tracker 40 tracks the target 37 by contrasting the target 37 with its background. For the helicopter illustrated in FIG. 2, the helicopter is contrasted with the blue sky background. If the helicopter were camouflaged to match the trees of a forest and sufficient contrast were not available then automatic video tracker 40 would not be utilized as the tracking means for airborne video tracking system 20.

It should be noted that acquisition sight 22 and track handle 38 are connected in series allowing an operator at console 24 to acquire control of the tracking of a target 37 from acquisition sight 22 by depressing trigger switch 39 on track handle 38. Automatic video tracker 40 is also connected in series with track handle 38 allowing the operator to use automatic video tracker 40 to track target 37.

By using track handle 38 the operator at console 24 can position the target 37 within a wide field of view monitor 46 and within a narrow field of view monitor 48 which is located at the operator console 24. Displayed on the wide field of view monitor 46 and the narrow field of view monitor 48 is the video from the optics at observer's station 26.

Figure 3:
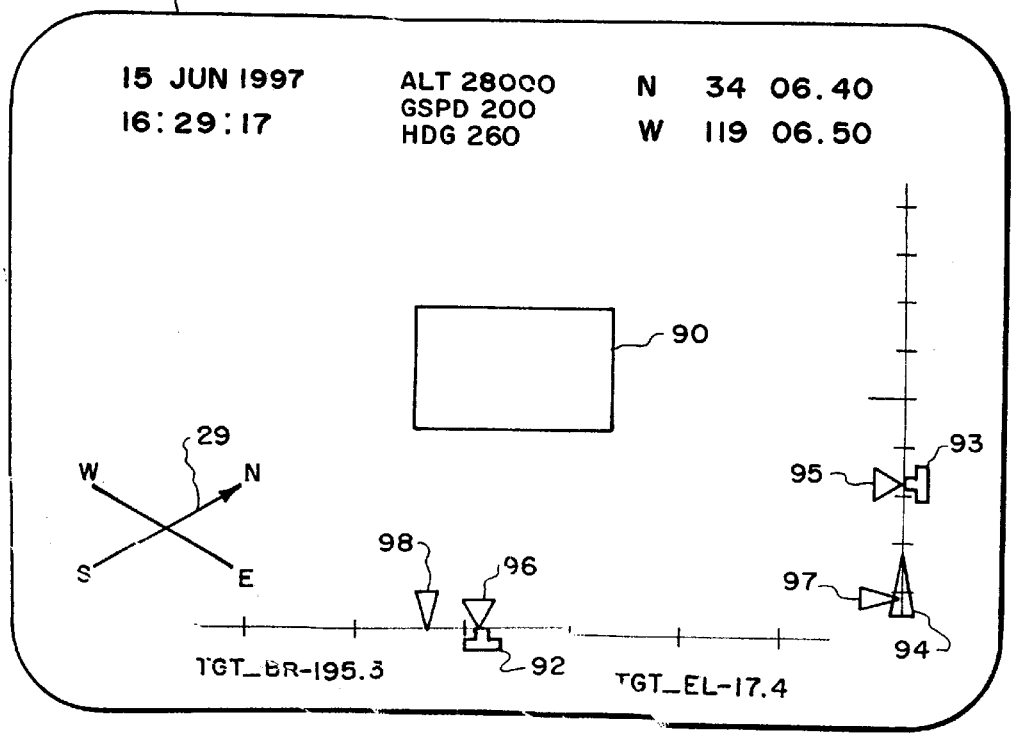
FIG. 3 illustrates an example of the position information provide on the wide field of view monitor of FIG. 2 for a target of interest.

As shown in FIG. 3 positional information graphics are overlaid on the wide field of view display provided by monitor 46. The display provided by monitor 46 also includes a compass 29. Each of the positional elements which appear on monitor 46 is labeled, for example, ALT (altitude), GSPD (ground speed) and HDG (heading). The year is displayed in four digits on the wide field of view display. The target bearing (TGT_BR) and the target elevation (TGT_EL) is also displayed on monitor 46.

In a like manner positional information graphics are displayed on the narrow field of view monitor 48. This positional information graphics may include all the information displayed on wide field of view monitor 46 except for tracking box 90.

There is also located at operator console 24 a pair of video tape recorders 50 and 52 which receive and then record the video from the optics at the observer's station 26. Recorder 52 records the video from the narrow field of view camera 80 generated by the optics at observer station 26, with overlaid graphics generated by computer 42, while recorder 50 records the video from the wide field of view camera 74 generated by the optics at observer station 26, with overlaid graphics generated by computer 42. The operator can either turn on or turn off video tape recorders 50 and 52 by using the F4 function key on keyboard 41.

A gimballed mirror 56 located at observer station 26 receives image forming light from target 37 when mirror 56 is directed along optical path 67 to target 37 (which is also the line of sight to the target 37 as depicted in FIG. 2). Gimballed mirror 56 then reflects or directs the image forming light from target 37 along an optical path 62 to a pair of turning mirrors 64 and 68 which are positioned downstream from gimballed mirror 56 along optical path 62.

A portion of the image forming light from helicopter 37 is reflected by gimballed mirror 56 to turning mirror 64 and then redirected by turning mirror 64 along an optical path 65 to the lens of a wide field of camera 74. The remainder of the image forming light from helicopter 37 is reflected by gimballed mirror 56 to turning mirror 68 and then redirected along an optical path 66 by turning mirror 68 to the lens 73 of a telescope 70. Image forming light from helicopter 37 which passes through and then exits telescope 70 via a lens 79 is directed along optical path 78 to a flip mirror 76. As shown in FIG. 2, flip mirror 76 is positioned to direct the image forming light exiting telescope 70 along an optical path 77 to a narrow field of view camera 80. By rotating flip mirror 76 90 degrees from the position depicted in FIG. 2, flip mirror 76 can direct image forming light exiting telescope 70 to a narrow field of view camera 82. In the preferred embodiment of the present invention, narrow field of view camera 80 may be a black and white camera, while narrow field of view camera 82 may be a color camera or a low light level camera adapted for night missions.

That portion of the image forming light reflected by gimballed mirror 56 to turning mirror 64 which is a one inch turning mirror and then redirected by turning mirror 64 along an optical path 65 to the lens of a wide field of camera 74 comprises a one inch bundle of light. Turning mirror 64 is a one inch turning mirror. The view provided by camera 74 is an overall perspective of the scene including target 37 which the operator at operator console 24 observes on wide field of view monitor 46. The wide field of view appearing on monitor 46 is about four degrees.

Turning mirror 68 is a four inch turning mirror reflecting a four inch bundle of light from gimballed mirror 56 through telescope 70 to narrow field of view camera 80 or narrow field of view camera 82. Narrow field of view cameras 80 and 82 are coupled through a switch 84 to a video time inserter/video data inserter 44 which is comprised of two video overlay circuit boards in computer 42 and which is connected to narrow field of view monitor 48. The view provided by narrow field of view monitor 48 is very narrow and may be in the order of 0.1 degrees. Telescope 70 is a zoom telescope which can zoom from 20 inches to about 120 inches. At 20 inches zoom telescope 70 provides a one degree field of view, while at 120 inches the field of view is about a 0.1 degree field of view. Telescope 70 is connected to control unit 36 which provides control signals to telescope 70 to control the zoom function of telescope 70.

Gimballed mirror 56 is gyro stabilized to eliminate the roll of the aircraft and heading changes by the aircraft when tracking the target 37. The gimballed mirror 56 includes a support stand 57 and a gimbal interface 58 which is electrically connected to control unit 36. Control unit 36 which, for example, is responsive to an operator using track handle 38 provides analog control signals to the gimbal interface 58, which, in turn, orientates or steers gimballed mirror 56 to track target 37. There is also connected in series with track handle 38 an automatic video tracker 40 which when turned on by the operator locks on to video contrast to track target 37.

Gimballed mirror 56 and turning mirror 68 should be flat, for example, in the order of lambda over ten. Turning mirror 64 is also very flat, in the order of lambda over four. Gimballed mirror 56 which is a four inch mirror, is also light weight being fabricated from beryllium.

The light incident upon lens 73 of telescope 70 has a one inch hole or void in its center resulting from that portion of the image forming light which is reflected by turning mirror 64 to wide field of view camera 74. In addition, lens 73 has a one inch centrally located dark spot 72 which is non-transparent and which is optically aligned with mirror 64.

When power is first turned on to airborne video tracking system 20 monitor 47 provides the main screen menu which sets forth the function for each of the function keys on keyboard 41.

```
         F1    Help              15 JUN 1997
         F2    Setup             16:29:17
         F3    Toggle Color      N    34   06.40
         F4    Record            W    119  06.50
<Ctrl>   F4    Stop              Altitude:       28000
         F5    Cue Point         Gnd Speed:      200
         F6    ACQ Sight         Heading:        260
         F7    IRDS              Roll:           0.0
         F8    Waypoint          Pitch:          0.0
         F9    Triangulate
         F10   Marked Target
    ACTIVE ACQ SIGHT
         MARKED TARGET
166:16:25:05
N    34    06.60
W    119   06.60
Estimated Alt:  0
Calculated Alt: 0
Change altitude if desired.
Press <Enter> to accept
altitude...
```

The active pointing device is acquisition sight 22 which appears on the main screen menu. The active pointing device may be also be the infrared display system 34 with the following information appearing on the main menu screen.

```
         F1    Help              15 JUN 1997
         F2    Setup             16:29:17
         F3    Toggle Color      N    34   06.40
         F4    Record            W    119  06.50
<Ctrl>   F4    Stop              Altitude:       28000
         F5    Cue Point         Gnd Speed:      200
         F6    ACQ Sight         Heading:        260
         F7    IRDS              Roll:           0.0
         F8    Waypoint          Pitch:          0.0
         F9    Triangulate
         F10   Marked Target
    ACTIVE IRDS
         MARKED TARGET
166:16:25:05
N    34    06.60
W    119   06.60
Estimated Alt:  0
Calculated Alt: 0
Change altitude if desired.
Press <Enter> to accept
altitude...
```

When the operator depresses the function F1 on keyboard 41, a Help Screen appears on monitor 47 at the operator console 24. Pages 1 and 2 of the Help screen provide a detailed explanation for each of the function keys on keyboard 41. Page 1 of the Help screen is set forth below.

```
                           Help Screen
         F1    Help -            Display help page #2.
         F2    Setup -           Perform system calibration/boresight,
                                 set waypoints.
<Alt>    F2    Setup -           Perform alternate version of F2 setup.
         F3    Toggle Color -    Toggle overlay color between white,
                                 black and off.
<Ctrl>   F4    Stop-             Stop both VTRs.
         F4    Record -          Start recording on both VTRs.
         F5    Cue Point -       Returns the LOS to the last F9 or F10
                                 selection.
<Ctrl>   F5    Cue Point -       Save Cued Point to file with descrip-
                                 tion.
<Alt>    F5    Cue Point -       Restore Cued Point from the file and
                                 track.
         F6    ACQ Sight -       Select acquisition sight as the active
                                 pointing device.
         F7    IRDS -            Select IRDS as the active pointing
                                 device.
<Alt>    F7    IRDS -            Slave IRDS to the Cue Point location.
         F8    Waypoint -        Select a waypoint as the active
                                 pointing device.
<Alt>    F8    Flight Path -     Select Flight Path file (track.dat) way-
                                 points as the active pointing device.
<Ctrl>   F8                      Select an astronomic object as the active pointing
                                 device.
<Shift>  ESC                     Exit program from main screen.
                                 Press any key to return to main screen.....
```

The operator can toggle to page 2 of the help screen by depressing the F1 on keyboard 41. The F1 key on keyboard 41 cannot be used to return to the main screen. Page 2 of the Help screen is set forth below.

```
                           Help Screen
         F1    Help -            Display help page #1.
         F9    Triangulate Target -  Calculate position of the target
                                 from the previous and current
                                 designated line of sight vectors.
         F10   Mark Target -     Calculate position of the target
                                 being viewed. Hold F10 down to
                                 average marked position once a
                                 second.
<Alt>#         Where #           is 1, 2, ..., 9, or 0. Select way-
                                 point #1, #2, .... or #10 as the
                                 active pointing device. Qualify
                                 with shift key to select
                                 astronomic object.
<Shift>#                         Outputs location in NMEA-0183
                                 protocol. Where # is the number
                                 of the waypoint (1, 2, ... , 9,
                                 or 0)
                                 or P for the platform or Q for the
                                 Cued Point. Turn output off with
                                 ?.
<Shift>        ESC               Exit program from main screen.
                                 Press any key to return to main screen.....
```

When the function key F2 is depressed by the operator, the setup screen is displayed for the operator allowing the operator to perform a system calibration or boresight and set waypoints. When the function keys ALT and F2 are depressed by the operator, the operator can preform an alternate system calibration or boresight and set waypoints.

The function key F3 allows the operator to change the overlay color on wide field of view monitor 46 and narrow field of view monitor 48. The function key F4 activates recorders 50 and 52, while <Ctrl> F4 de-activates recorders 50 and 52. The function key F4 is currently being used on one P3 aircraft platform.

The function key F5 allows the operator to point the optical system of FIG. 2 including gimballed mirror 56 toward a cue point. A cue point is a buffer which stores the last marked or triangulated location of a target. The cue point may be the active pointing device.

Depressing the F5 key on keyboard 41 slaves tracking to the cue point buffer. Depressing <Ctrl> F5 on keyboard 41 allows the operator to enter a description and save the cue point to a file CUEPOINT.DAT, while <Alt> F5 allows the operator to restore the last cue point saved in the file CUEPOINT.DAT. The UP and DOWN arrow keys on keyboard 41 allow the user to scroll the CUEPOINT.DAT file to select a particular saved target location. The <ENTER> key allows the operator to use the selected target location as the active pointing device, that is gimballed mirror 56 will point to the selected target location.

The function key F6 selects acquisition sight 22 as the means to track target 37. The function key F7 selects infrared display system 34 as the active pointing or tracking device, while <ALT> F7 slaves or directs infrared display system 34 to the cue point location for a selected target. It should be noted that the cue point location is the location of the target currently in the cue point buffer. The cue point buffer may have a cue point location from the CUEPOINT.DAT file, a marked target or a triangulated target.

The function key F8 allows the operator to select one of fifteen waypoints as the active pointing device. Selecting a waypoint results in gimballed mirror 56 pointing to the latitude, longitude and altitude of the selected waypoint. Depressing <Alt> F8 allows tracking system 20 to track a vehicle with a known flight path such as a satellite or missile being launched. When invoked flight path tracking commences with the location first listed in the file "TRACK.DAT". Flight path data for the vehicle being tracked by tracking system 20 includes latitude, longitude, altitude and time. Gimballed mirror 56 is directed by computer 42 to point to the flight path of the vehicle being tracked. Depressing <Ctrl> F8 selects one of fifteen Astronomic bodies such as the sun or moon as the active pointing device.

The function key F9 allows the operator to triangulate the location of the target 37 being tracked by airborne video tracking system 20 to calculate the present latitude and longitude of target 37 using an estimated altitude previously supplied to airborne video tracking system 20 by the operator. The estimated altitude entered by the operator at operator console 24 is displayed in the marked target box in the lower portion of console display 47. The triangulation function can be used to accurately determine the altitude of target 37 after the operator enters an estimated altitude for target 37.

When the operator holds the F10 key in a down position the marked target processing function continues at a rate of once per second.

When the operator depresses the function key ALT and the key 1 on keyboard 41, the operator selects waypoint one as the active pointing device. In a like manner, the operator can select waypoint 2, waypoint 3, waypoint 4, waypoint 5, waypoint 6, waypoint 7, waypoint 8, waypoint 9 or waypoint 10 as the active pointing device by simultaneously depressing the ALT key and the key 2, 3, 4, 5, 6, 7, 8, 9 or 0 depending upon which waypoint the operator desires to use as the active pointing device. To select waypoint 11 through 15 the operator uses the select waypoint screen.

Selecting an astronomic object requires the operator to depress the <Shift> key and the <Alt> key and then the number of the astronomic object from 1 through 10. To select astronomic objects 11 through 15 the operator uses the select astronomic objects screen.

It should be noted that the operator can not select a particular waypoint as the active waypoint whenever the operator is at the Help screen or at the alternate calibration screen entitled Gimbal Drive Calibration.

The <Shift> key and a number key on keyboard 41 supplies the selected waypoint to a moving map display 25 on board the platform for tracking system 20. The NMEA-0183 protocol is used to provide the selected waypoint to the moving map display 25. The <Shift> key and P key on keyboard 41 provides the platform location to the moving map display 25. The <Shift> key and Q key on keyboard 41 provides the cue point location to the moving map display 25. The moving map display 25 is deactivated by the "?" key on keyboard 41.

An operator at operator console 24 can first estimate the altitude by knowing the altitude of the aircraft and then making an educated guess as to the difference between the aircraft altitude and the target altitude.

The Setup Screen which appears on monitor 47 at the operator console 24 is set forth below. The operator accesses the Setup Screen by depressing the F2 key on keyboard 41 while the main menu is being displayed on monitor 47. This allows the operator at operator console 24 to perform a system calibration/boresight of the airborne video tracking system 20 (illustrated in FIG. 2) and to set the waypoints.

| Setup Menu | ACTIVE ACQ SIGHT |
|---|---|
| 1    Calibrate Gimbal Offsets. | |
| 2    Calibrate Gimbal Drive. | |
| 3    Calibrate Gimbal Input. | |
| 4    Calibrate Acquisition Sight. | |
| 5    Calibrate IRDS. | |
| 6    Adjust Tracking Box. | |
| 7.   Set Gimbal Limit Points. | |
| 8.   Edit Waypoints. | |
| Enter password: ******** | |
| Press <Esc> to return to main screen. | |

From the setup screen, the operator can calibrate Gimbal Offsets by depressing the one key on keyboard 41. This calibration is required since there is an alignment error between the inertial navigation system 30 and gimballed mirror 56. This alignment error may be between three degrees and four degrees. The calibration factor for the error is a pitch calibration factor with respect to the frame of the aircraft platform.

The operator can also calibrate gimbal interface 58 from the setup screen by depressing the two key on keyboard 41. By selecting the three key on keyboard 41, the operator can calibrate input signals supplied from gimbal interface 58 through control unit 36 to computer 42. By selecting the four key on keyboard 41, the operator can calibrate acquisition sight 22.

Referring to FIGS. 1, 2 and 3, from the setup screen, the operator can calibrate infrared display system 34 by depressing the five key on keyboard 41. Depressing the six key on keyboard 41 allows the operator to change the size of tracking box 90 (FIG. 3) which is displayed on wide field of view monitor 46. The size (including width, height and position on monitor 46) of the tracking box 90 is changed whenever there is a change in the zoom function on telescope 70. Tracking box 90 represents the narrow field of view within wide field of view monitor 46.

Depressing the seven key on keyboard 41 allows the operator to set gimbal limit points for gimballed mirror 56 to prevent damage to gimballed mirror 56. Depressing the eight key on keyboard 41 allows the operator to edit waypoints which are fixed locations at a fixed altitude above sea level.

It should be noted that the Setup Screen as well as other screens display the active pointing device in the upper right hand corner. The active pointing devices are the cue point buffer, the acquisition sight, the infrared display system and selected waypoints, the active flight path, and the selected astronomic object. The setup screen also requires a password which the operator must provide to allow the operate to calibrate any of the devices identified in the setup screen.

The Calibrate Gimbal Offsets which appears on monitor 47 at the operator console 24 is set forth below. The operator accesses the Calibrate Gimbal Offsets Screen by depressing the 1 key on keyboard 41 while in the Setup Screen.

---

Calibrate Gimbal Offsets         ACTIVE ACQ SIGHT
1) Turn aircraft for a view of the horizon.
2) Set Estimated Altitude to 0.
3) Scan horizon while monitoring the compass overlay. The compass will be visible at and below the horizon.
4) Adjust the Gimbal Pitch Offset to match the compass visibility threshold with the horizon.
+ or UP        Increment offset
− or DOWN    Decrement offset
Gimbal Pitch Offset (in degree): 0.00
Press <Enter> to save change.
Press <Esc> to return to main screen ...

---

The + key or the up arrow key on keyboard 41 is used to increment the pitch compensation error provided by computer 42, while the − key or the down arrow key are used to decrement the pitch compensation error provided by computer 42. When gimballed mirror 29 scans from the forward portion of the aircraft to the rearward portion of the aircraft along the horizon compass 29 blinks on and off, when tracking system 20 is calibrated for the pitch error.

The Calibrate Gimbal Drive Screen which appears on monitor 47 at the operator console 24 is set forth below. The operator accesses the Calibrate Gimbal Drive Screen by depressing the 2 key on keyboard 41 while in the Setup Screen.

---

Gimbal Drive Calibration        ACTIVE ACQ SIGHT
Azimuth scale factor:           1.710
Azimuth offset (volts):         2.720
Elevation Scale factor:         0.870
Elevation offset (volts):       0.130
Azimuth velocity lag factor:    0.000
Elevation velocity lag factor:  0.000
Azimuth attitude lag factor:    0.000
Elevation attitude lag factor:  0.000
Press <Tab> or <Up> or <Down> to use new value.
Press <Enter> to save changes.
Press <Esc> to return to main screen ...

---

The Azimuth scale factor, Azimuth offset (volts), Elevation Scale factor and Elevation offset (volts) for the gimbal drive calibration values are edited and then accepted using the Tab or Up arrow or Down arrow keys on keyboard 41. In addition, the Azimuth velocity lag factor, Elevation velocity lag factor, Azimuth attitude lag factor and Elevation attitude lag factor for the gimbal drive calibration are now provided to compensate for lag within tracking system 20 when the aircraft having system 20 therein is moving. These gimbal drive calibration values are adjusted to allow for accurate and concise steering of gimballed mirror 56 by computer 42 via control unit 36.

The Calibrate Gimbal Input Screen which appears on monitor 47 at the operator console 24 is set forth below. The operator accesses the Calibrate Gimbal Input Screen by depressing the 3 key on keyboard 41 while in the Setup Screen.

---

Gimbal Input Calibration        ACTIVE ACQ SIGHT
Azimuth scale factor:           1.040
Azimuth offset (volts);         −0.540
Elevation scale factor:         1.270
Elevation offset (volts):       0.230
Focal length scale factor:      1.058
Focal length offset (volts):    0.092
Press <Tab> or <Up> or <Down> to use new value.
Press <Enter> to save changes.
Press <Esc> to return to main screen ...

---

The Azimuth scale factor, Azimuth offset (volts), Elevation Scale factor and Elevation offset (volts) for the gimbal input calibration values are edited and then accepted using the Tab or Up arrow or Down arrow keys on keyboard 41. These calibration values provide accurate calibration for the gimbal position indicators 95, 96, 97 and 98 on the wide field of view screen 46 shown in FIG. 3.

There is also a calibration requirement that a focal length scale factor and a focal length offset be provided since telescope 70 has an adjustable focal length and the focal length scale factor and offset are supplied to remote computer 47.

When computer 42 is used to control gimballed mirror 56, the gimbal position indicators 95 and 96 align respectively with the acquisition pointing angle indicators 93 and 92. When computer 42 is providing an active waypoint and an operator is using the track handle 38 to steer the gimballed mirror 56 the gimbal position indicators 97 and 98 may differ significantly from the acquisition pointing angle indicators 93 and 92 as shown in FIG. 3.

The Calibrate Acquisition Sight Screen which appears on monitor 47 at the operator console 24 is set forth below. The operator accesses the Calibrate Acquisition Sight Screen by depressing the 4 key on keyboard 41 while in the Setup Screen.

---

Acquisition Sight Calibration    ACTIVE ACQ SIGHT
Azimuth scale factor:            1.150
Azimuth offset (volts):          1.360
Elevation scale factor:          1.100
Elevation offset (volts):        0.110
Press <Tab> or <Up> or <Down> to use new value.
Press <Enter> to save changes.
Press <Esc> to return to main screen ...

---

The Azimuth scale factor, Azimuth offset (volts), Elevation Scale factor and Elevation offset (volts) for the acquisition sight calibration values are edited and then accepted using the Tab or Up arrow or Down arrow keys on keyboard 41.

The Calibrate Infrared Display System Screen which appears on monitor 47 at the operator console 24 is set forth below. The operator accesses the Infrared Display System Screen by depressing the 5 key on keyboard 41 while in the Setup Screen.

| IRDS Calibration | ACTIVE IRDS |
|---|---|
| Azimuth scale factor: | 1.000 |
| Azimuth offset (volts): | 2.560 |
| Elevation Scale factor: | 1.000 |
| Elevation offset (volts): | 0.500 |
| Press <Tab> or <Up> or <Down> to use new value. | |
| Press <Enter> to save changes. | |
| Press <Esc> to return to main screen ... | |

The Azimuth scale factor, Azimuth offset (volts), Elevation Scale factor and Elevation offset (volts) for the infrared display system calibration values are edited and then accepted using the Tab or Up arrow or Down arrow keys on keyboard 41.

The Adjust Tracking Box Screen which appears on monitor 47 at the operator console 24 is set forth below. The operator accesses the Adjust Tracking Box by depressing the 6 key on keyboard 41 while in the Setup Screen.

| Adjust Tracking Box | ACTIVE IRDS |
|---|---|
| Use cursor keys to move tracking box. | |
| Use following keys to size tracking box: | |
|   T Taller | |
|   S Shorter | |
|   W Wider | |
|   N Narrower | |
| Set the lens to the widest NFOV and adjust the box size. | |
| Press F10 to adjust the box to narrowest FOV. | |
| Press <Enter> to save changes... | |
| Press <Esc> to return to main screen... | |

The cursor keys on keyboard 41 are utilized to move tracking box 90 left, right, up or down on wide field of view monitor 46. Tracking box 90 is sized using the keys T, S, W and N on keyboard 41. Tracking box 90 illustrates the boundary of the narrow field of view overlaid on wide field of view monitor 46. The notes near the bottom of the Adjust Tracking Box Screen allow for the calibration of tracking box 90 to provide for a dynamic tracking box 90 which represents the actual size of the narrow field of view.

The Set Gimbal Limit Points Screen which appears on monitor 47 at the operator console 24 is set forth below. The operator accesses the Set Gimbal Limit Points Screen by depressing the 7 key on keyboard 41 while in the Setup Screen.

| Gimbal Limits (degrees) | | ACTIVE IRDS |
|---|---|---|
| Forward warning point: | 35 | |
| Aft warning point: | −5 | |
| Up warning point: | 35 | |
| Down warning point: | −35 | |
| Forward stop point: | 45 | |
| Aft stop point: | −15 | |
| Up stop point: | 45 | |
| Down stop point: | −45 | |
| Press <Tab> or <Up> or <Down> to use new value. | | |
| Press <Enter> to save changes. | | |
| Press <Esc> to return to main screen... | | |

The gimbal limits are set to prevent damage to gimballed mirror 56. Warning indicators, such as warning indicator 94 shown in FIG. 3 are also set via the set gimbal limits point screen. Warning indicators are provided at each end of the azimuth and elevation axis depicted in FIG. 3. When a position indicator such as position indictor 97 passes the warning point, the warning indicator 94 is displayed as shown in FIG. 3. This indicator tells the operator at operator console 24 that gimballed mirror 56 is approaching its azimuth and elevation limits for safe operation of gimballed mirror 56. The forward stop point, aft stop point, the up stop point and the down stop point for gimballed mirror 56 are edited from the set gimbal limits point screen and limit the drive signals supplied by control unit 36 to gimbal interface 58 to prevent damage to mirror 56.

The Edit Waypoints Screen which appears on monitor 47 at the operator console 24 is set forth below. The operator accesses the Edit Waypoints Screen by depressing the 8 key on keyboard 41 while in the Setup Screen.

| | Edit Waypoints. | | | ACTIVE ACQ SIGHT | |
|---|---|---|---|---|---|
| | Latitude | | Longitude | Altitude | Description |
| 1) N | 27 | 48.60 W | 97 05.27 | 4 ft. | Mustang Island |
| 2) N | 27 | 45.08 W | 97 07.46 | 150 ft. | Water Tower |
| 3) N | 27 | 42.03 W | 97 09.42 | 50 ft. | Water Tank |
| 4) N | 27 | 41.40 W | 97 15.40 | 10 ft. | Resolution Chart |
| 5) N | 27 | 41.50 W | 97 16.90 | 1080 ft. | Control Tower |
| 6) N | 27 | 42.30 W | 97 21.82 | 60 ft. | Wendy's |
| 7) N | 27 | 44.00 W | 97 22.50 | 5 ft. | Water Tower |
| 8) N | 27 | 42.68 W | 97 19.57 | 100 ft. | Texas A & M |
| 9) N | 27 | 47.90 W | 97 23.57 | 560 ft. | Tall Bldg. |
| 10) N | 27 | 48.70 W | 97 23.68 | 275 ft. | Bridge |
| 11) N | 34 | 06.43 W | 119 04.00 | 1413 ft. | Dome |
| 12) N | 34 | 07.37 W | 119 04.13 | 550 ft. | Lone Tree |
| 13) N | 34 | 06.67 W | 119 05.00 | 259 ft. | Water Tower |
| 14) N | 34 | 06.50 W | 119 03.88 | 1476 ft. | Laguna Peak |
| 15) N | 34 | 06.08 W | 119 04.00 | 1080 ft. | ET sign |
| Press <Tab> or <Up> or <Down> to use new value. | | | | | |
| Press <Enter> to save changes. | | | | | |
| Press <Esc> to return to main screen... | | | | | |

By accessing the Edit Waypoints Screen, the operator can edit the waypoint latitude, longitude, altitude and description fields for each waypoint shown on the screen.

In the alternative, the operator at operator console 24 can perform a system calibration/boresight of airborne video tracking system 20 by depressing the ALT key and F2 key on keyboard 41. This results in the following menu appearing on monitor 47 at operator console 24.

| Setup Menu | ACTIVE ACQ SIGHT |
|---|---|
| 1 | Calibrate INS. |
| 2 | Calibrate Gimbal Drive. |
| 3 | Calibrate Gimbal Input. |
| 4 | Calibrate Acquisition Sight. |
| 5 | Calibrate IRDS. |
| 6 | Adjust Tracking Box. |
| 7. | Set Gimbal Limit Points. |
| 8. | Edit Waypoints. |
| Enter password: ******** | |
| Press <Esc> to return to main screen. | |

When performing alternate calibration on the various components of airborne video tracking system 20, the operator must first process a gimbal input calibration by depressing the 3 key on keyboard 41 while the setup menu is being displayed on monitor 47. The following menu then appears on monitor 47.

| Gimbal Input Calibration | ACTIVE ACQ SIGHT |
|---|---|
| 1) | Select a waypoint using the ALT key. |
| 2) | Steer the gimbal to the waypoint. |
| 3) | Accept 1st line-of-sight with F10 key. |

-continued

```
 4)    Establish a new line-of-sight by one of the following:
       a)  Move platform to a new location.
       b)  Select a new waypoint using the ALT key.
 5)    Steer the gimbal to the waypoint.
 6)    Accept 2nd line-of-sight with F10 key.
 NOTE: The greater the change in azimuth and elevation
       the better the accuracy of the calibration.
 Select a waypoint with the ALT key.
 Press <Enter> to save changes...
 Press <Esc> to return to main screen...
```

The Alternate Gimbal Input Calibration can be performed when the aircraft upon which airborne video tracking system 20 is mounted is airborne. It is preferred that all calibration, other than the gimbal drive calibration, be performed on the ground to achieve the best results. The operator at operator console 24 first depresses the ALT key and either the 1, 2, 3, 4, 5, 6, 7, 8, 9 or 0 key on keyboard 41 to select a particular waypoint as a first line of sight.

For example, when the operator at operator console 24 depresses the ALT key and the 2 key, the selected waypoint will be Water Tower. The operator may then use track handle 38 to steer gimballed mirror 56 toward the selected waypoint (which is Water Tower) until gimballed mirror 56 acquires a line of sight with the selected waypoint. When gimballed mirror 56 acquires a line of sight with the selected waypoint, the selected waypoint will appear in the center of narrow field of view of monitor 48. The operator next uses the F10 key on keyboard 41 to accept this line of sight which is the first line of sight vector.

The operator at operator console 24 must next establish a second line of sight. The second line of sight may be establish by (1) moving the aircraft or platform to a new location, or (2) selecting a new waypoint by using the ALT key.

For example, when the operator depresses the ALT key and the 3 key, the second waypoint will be the Water Tank. The operator next uses track handle 38 to steer gimballed mirror 56 toward the Water Tank until gimballed mirror 56 acquires a line of sight with the Water Tank. When gimballed mirror 56 acquires a line of sight with the Water Tank, the Water Tank will appear in the center of narrow field of view of monitor 48. The operator next uses the F10 key on keyboard 41 to accept this line of sight which is the second line of sight vector. Computer 42 then calibrates the analog signals (azimuth and elevation) from gimbal interface unit 58 which indicate the azimuth and elevation of gimballed mirror 56.

It should be noted that the Gimbal Input Calibration menu appearing on monitor 47 includes a sentence which indicates to the operator which one of the six sequential steps the operator is required to execute to successfully complete the alternate gimbal input calibration. The Gimbal Input Calibration menu appearing on monitor 47 also includes a note which indicates to the operator that the accuracy of the calibration is dependent upon the change in azimuth and elevation between the first line of sight vector and the second line of sight vector.

When the alternate gimbal input calibration is complete the operator must next perform a gimbal drive calibration by first depressing the ALT key and F2 (accessing the setup screen) and then depressing the 2 key on keyboard 41. The following menu appears on monitor 47.

```
 Gimbal Drive Calibration              ACTIVE ACQ SIGHT
 Press F10 to auto calibrate the Gimbal Drive
 NOTE:    The Gimbal Input must be calibrated first.
 WARNING: The gimbal will automatically be panned over the full
          azimuth and elevation range within the warning indicators.
 Press <Enter> to save changes...
 Press <Esc> to return to main screen...
```

The Alternate Gimbal Drive Calibration menu is used to calibrate the analog signals (azimuth and elevation) provided by computer 42 to gimbal interface unit 58 to steer gimballed mirror 56. When the operator depresses the F10 key on keyboard 41 computer 42 calibrates the analog signals (azimuth and elevation) provided by computer 42 to gimbal interface unit 58 to steer gimballed mirror 56. The alternate gimbal drive calibration screen includes a warning message indicating that gimballed mirror 56 is panned over the full range of azimuth and elevation within its warning indicators 94 (illustrated in FIG. 3) during the calibration process. The alternate gimbal drive calibration screen also includes a message which indicates to the operator at operator console 24 that the alternate gimbal input calibration must be processed by computer 42 prior to the alternate gimbal drive calibration being processed by computer 42.

The alternate gimbal drive calibration and the alternate gimbal input calibration are each processed or calculated within the keyboard.c module.

When the operator depresses the ALT Key and F2 (accessing the setup screen) and then depresses the 2 key on keyboard 41, the following menu, which is the Alternate Acquisition Sight Calibration menu, appears on monitor 47.

```
 Acq Sight Calibration               ACTIVE WAYPOINT
                                     Lone Tree
 1)    Select a waypoint using the ALT key.
 2)    Point the Acquisition Sight to the waypoint.
 3)    Accept 1st line-of-sight with F10 key.
 4)    Establish a new line-of-sight by one of the following:
       a)  Move platform to a new location.
       b)  Select a new waypoint using the ALT key.
 5)    Point the Acquisition Sight to the waypoint.
 6)    Accept 2nd line-of-sight with F10 key.
 NOTE: The greater the change in azimuth and elevation
       the better the accuracy of the calibration.
 Designate 1st line-of-sight.
 Press <Enter> to save changes...
 Press <Esc> to return to main screen...
```

Acquisition sight 22 is calibrated by selecting a first waypoint to establish a first line of sight vector and then pointing acquisition sight 22 to the first waypoint prior to the operator at operator console 24 accepting the first line of sight vector by depressing the F10 key on keyboard 41. A second line of sight vector is next established by either pointing acquisition sight 22 at a second waypoint or moving the platform to a new location and then pointing acquisition sight 22 at the first waypoint. When the first and second line-of sight vectors have been accepted by the operator at operator console 24 then computer 42 automatically calibrates acquisition sight 22.

When the operator depresses the ALT Key and F2 (accessing the setup screen) and then depresses the 5 key on keyboard 41, the following menu, which is the alternate infrared display system calibration menu, appears on monitor 47.

| IRDS Calibration | ACTIVE WAYPOINT |
|---|---|
| | Lone Tree |

1) Select a waypoint using the ALT key.
2) Point the IRDS to the waypoint.
3) Accept 1st line-of-sight with F10 key.
4) Establish a new line-of-sight by one of the following:
   a) Move platform to a new location.
   b) Select a new waypoint using the ALT key.
5) Point the IRDS to the waypoint.
6) Accept 2nd line-of-sight with F10 key.
NOTE: The greater the change in azimuth and elevation the better the accuracy of the calibration.
Designate 2nd line-of-sight.
Press <Enter> to save changes...
Press <Esc> to return to main screen...

Infrared display system 34 is calibrated by selecting a first waypoint to establish a first line of sight vector and then pointing infrared display system to the first waypoint prior to the operator at operator console 24 accepting the first line of sight vector by depressing the F10 key on keyboard 41. A second line of sight vector is next established by either pointing infrared display system 34 to a second waypoint or moving the platform to a new location and then pointing infrared display system 34 to the first waypoint. When the first and second line-of sight vectors have been accepted by the operator at operator console 24 then computer 42 automatically calibrates infrared display system 34.

The Select Waypoint Screen which appears on monitor 47 at the operator console 24 is set forth below. The operator accesses the Select Waypoints Screen from the main menu screen by depressing the F8 key on keyboard 41.

| | Select Waypoint 12 | | | ACTIVE ACQ SIGHT | |
| | Latitude | Longitude | | Altitude | Description |
|---|---|---|---|---|---|
| 1) N | 27 48.60 W | 97 05.27 | 4 ft. | | Mustang Island |
| 2) N | 27 45.08 W | 97 07.46 | 150 ft. | | Water Tower |
| 3) N | 27 42.03 W | 97 09.42 | 50 ft. | | Water Tank |
| 4) N | 27 41.40 W | 97 15.40 | 10 ft. | | Resolution Chart |
| 5) N | 27 41.50 W | 97 16.90 | 1080 ft. | | Control Tower |
| 6) N | 27 42.30 W | 97 21.82 | 60 ft. | | Wendy's |
| 7) N | 27 44.00 W | 97 22.50 | 5 ft. | | Water Tower |
| 8) N | 27 42.68 W | 97 19.57 | 100 ft. | | Texas A & M |
| 9) N | 27 47.90 W | 97 23.57 | 560 ft. | | Tall Bldg. |
| 10) N | 27 48.70 W | 97 23.68 | 275 ft. | | Bridge |
| 11) N | 34 06.43 W | 119 04.00 | 1413 ft. | | Dome |
| 12) N | 34 07.37 W | 119 04.13 | 550 ft. | | Lone Tree |
| 13) N | 34 06.67 W | 119 05.00 | 259 ft. | | Water Tower |
| 14) N | 34 06.50 W | 119 03.88 | 1476 ft. | | Laguna Peak |
| 15) N | 34 06.08 W | 119 04.00 | 1080 ft. | | ET Sign |

Select the number of the desired waypoint.
Press <Enter> to activate the selection.
Press <Esc> to return to main screen...

By accessing the Select Waypoint Screen the operator can select one of fifteen waypoints as the active pointing waypoint for airborne video tracking system 20. For example if the operator at operator console 24 depresses key 1 then key 2 followed by the enter key on keyboard 41, the active pointing waypoint for tracking system 20 will be Lone Pine (waypoint 12).

The narrow field of view monitor 48 provides the following display for an operator to view.

| | Marked Target |
|---|---|
| | 166:16:25:05 |
| | N 34 06.60 |
| | W 119 06.60 |
| | Altitude = 0 |
| | Bearing = 195.3 |
| | Slant Range = 26.27 |
| 166:16:29:17 | |

Whenever Marked Target data is displayed on a narrow field of view monitor which includes scales then the Marked Target data appears on the left side of the screen.

The program listing for the computer software used by computer 42 is written in well known computer software language C. Upon power up of system 20, the software enters the main program which is in the CAPS.C module. This module initializes and updates all airborne video tracking system computer functions. This module also includes an abort function which exits to dos (program steps 104 and 106). If, for example, an operator attempts to use the software on an authorized computer the software will exit to dos.

Figure 4A:
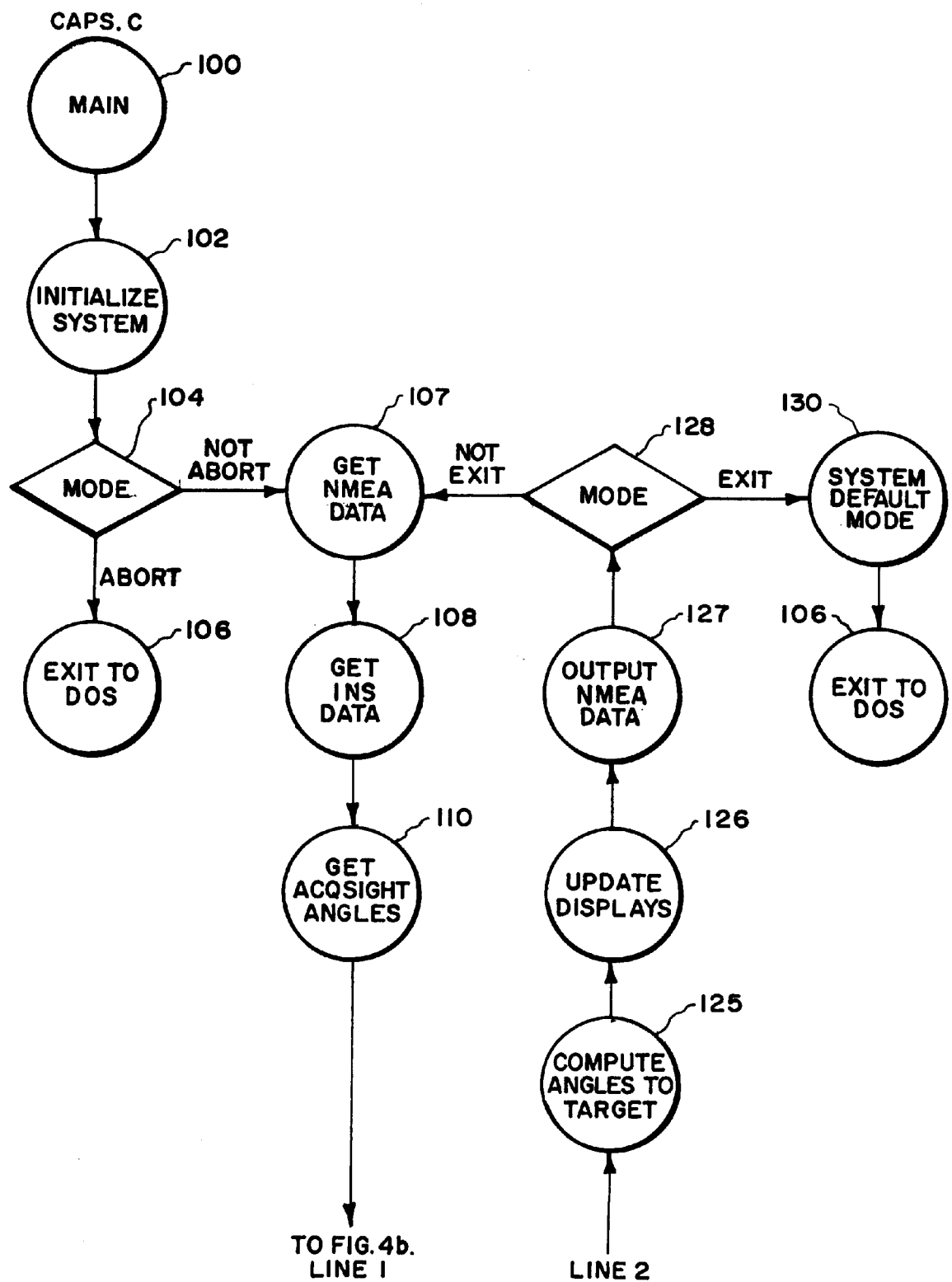
FIGS. 4a and 4b are a flow chart for the main program module caps.c.
Figure 4B:
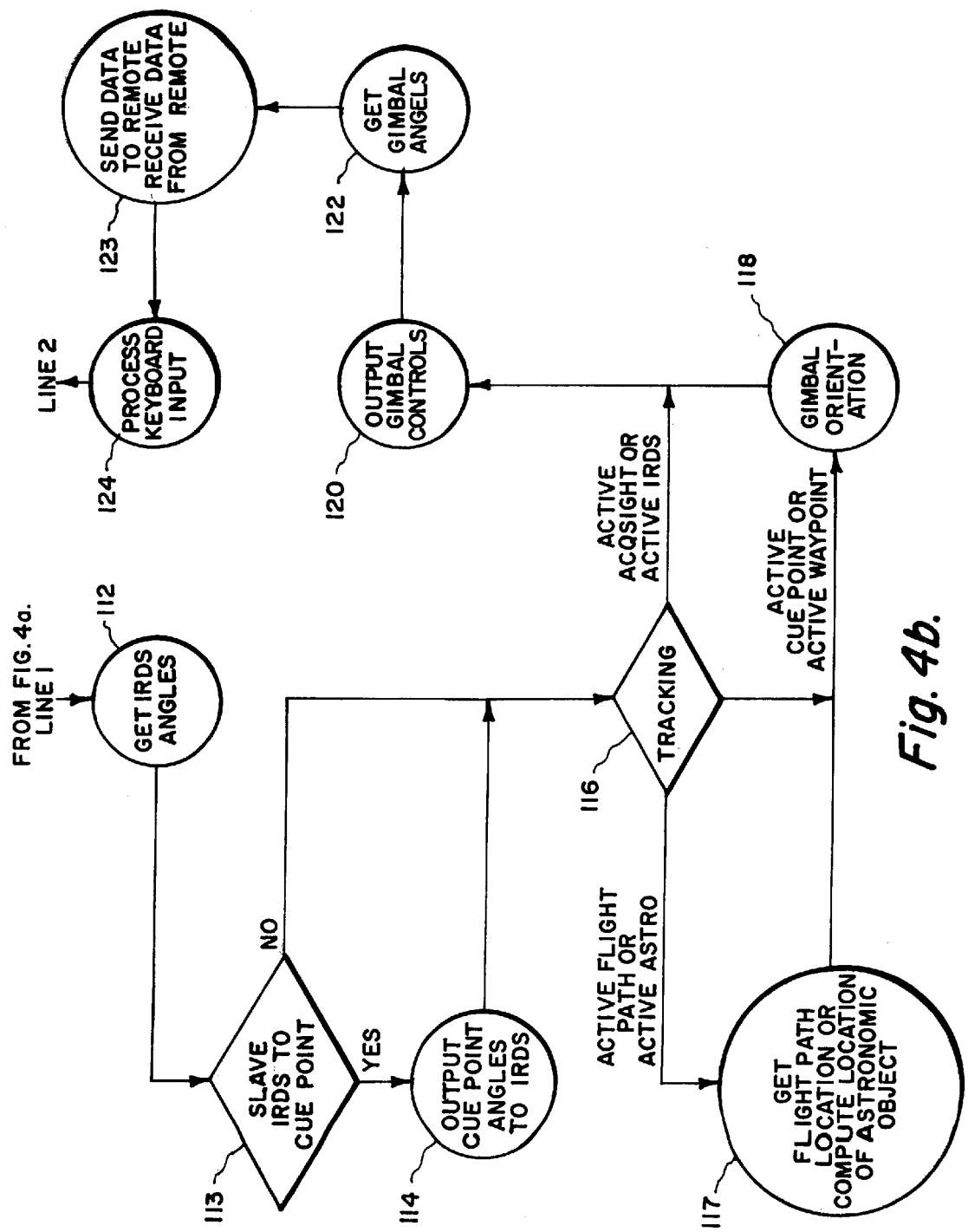

Referring to FIGS. 1, 2 and 4, after system initialization (program step 102) and an indication not to abort, the software retrieves data in the National Marine Association Electronics (NEMA) protocol (program step 107) which is provided to computer 42. The data is provided by an external Global Positioning System. During program step 108, the software retrieves and then updates data from inertial navigation system 30.

During program step 110 the software retrieves the acqsight angles from acquisition sight 22. During program step 112 the software retrieves the irds angles from infrared display system 34. During program step 113 the software checks to determine if the infrared display system 34 is slaved to the cue point which occurs whenever the operator depresses <Alt> F7 on keyboard 41. During program step 114 the cue point angles are output to infrared display system 34. The cue point angles represent the location last stored in the cue point buffer.

When tracking is by an active flight path or an active astronomic object the software proceeds from program 116 to program step 117 to get the flight path location or to compute the location of the astronomic object. The gimbal orientation angles are next determined by computer 42 (program step 118).

When tracking is by active waypoint or active cue point, the software determines the required gimbal orientation angles for the waypoint or cue point and then provides them in the form of analog output signals which are supplied to gimbal interface 58. Gimbal interface 58 then orientates gimballed mirror 56 to the waypoint allowing airborne video tracking system 20 to begin tracking (program steps 118 and 120).

When tracking is by acquisition sight 22 or by infrared display system 34, the analog output signals for controlling the orientation of gimballed mirror 56 are determined by computer 42 from the acqsight and irds angular inputs and then supplied via control unit 36 to gimbal interface 58 (program step 120) to point gimballed mirror 56 at the target 37. During program step 122 the software retrieves the gimbal angles for gimballed mirror 56 from gimbal interface 58 through analog output signals from interface 58.

During program step 123, data is provided to remote computer 27 via RS-422 data interface. Remote computer 27 also supplies to computer 42 a command which allows computer 27 to control operation of infrared display system 34.

During program step 125, the gimbal angle to target 37, its bearing angle relative to true north and elevation angle are computed in real time.

The keyboard functions entered by the operator at operator console 24 are processed during program step 124. The console display appearing on monitor 47, the wide field of view display appearing on monitor 46 and the narrow field of view display appearing on monitor 48 are updated during program step 126. It should be noted that tracking system 20 supports three independent narrow field of view displays. During program step 127 data is output in the NMEA-0183 protocol for use by moving map display 25.

During program step 128 the mode of operation is checked. If the mode is changed to exit by the operator at operators console 24 the software proceeds to re-establish the system default mode (program step 130) and then exits to dos (program step 106) and returns the displays and computer memory of airborne video tracking system 20 to their default mode.

Figure 5:
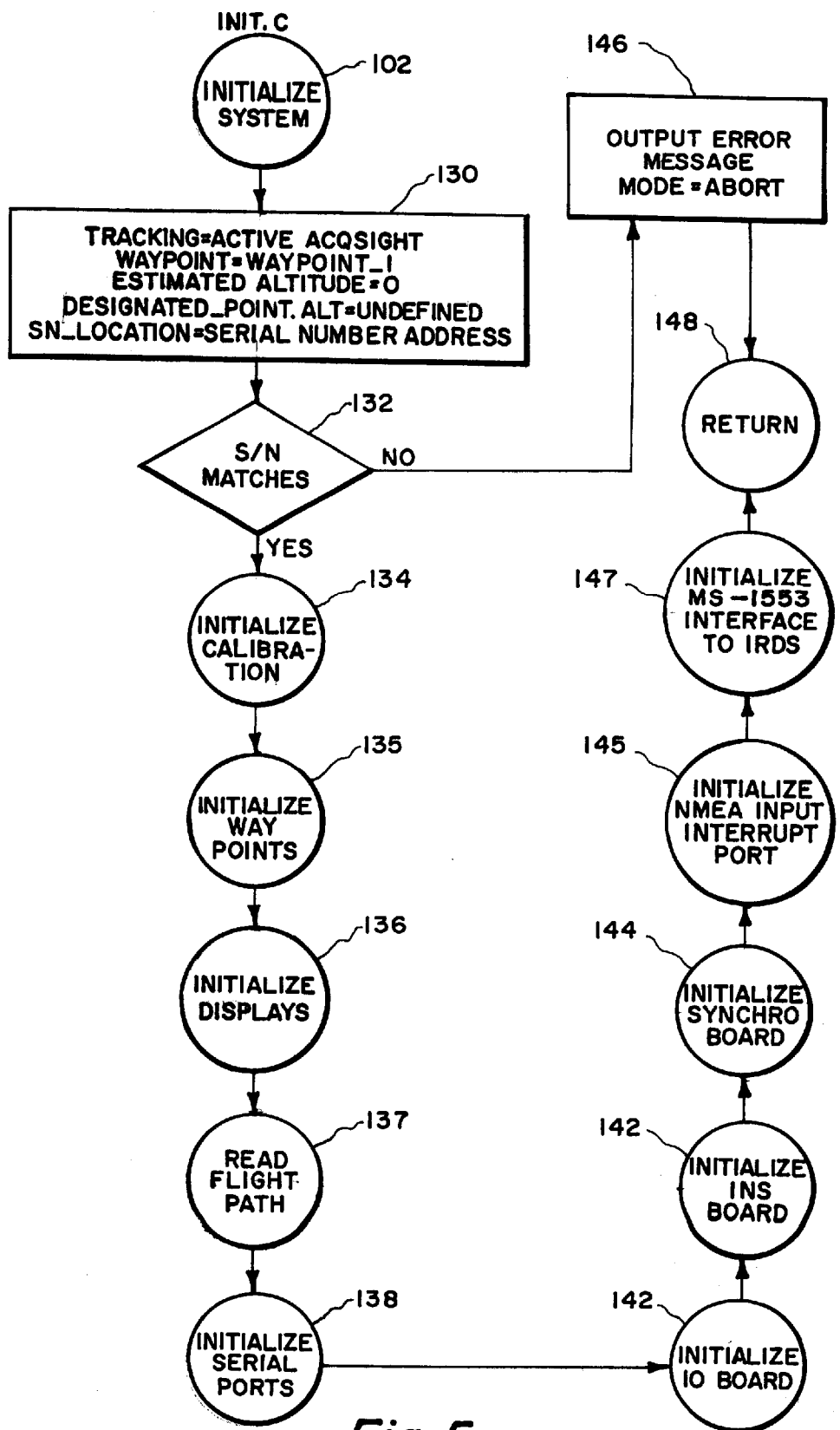
FIG. 5 is a flow chart for the initialization program module init.c.
Figure 6A:
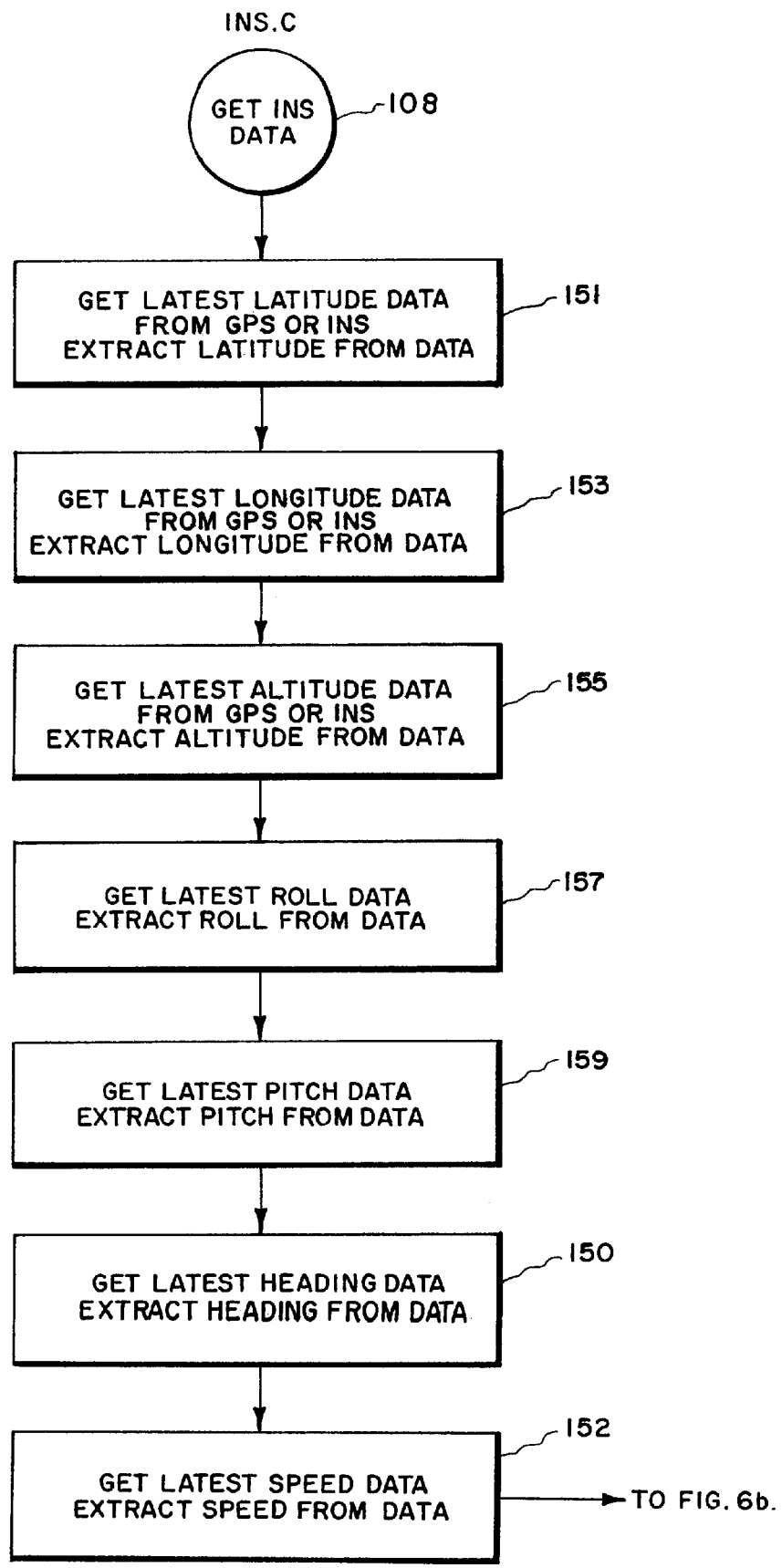
FIGS. 6a and 6b are a flow chart for the inertial navigation system program module ins.c.
Figure 6B:
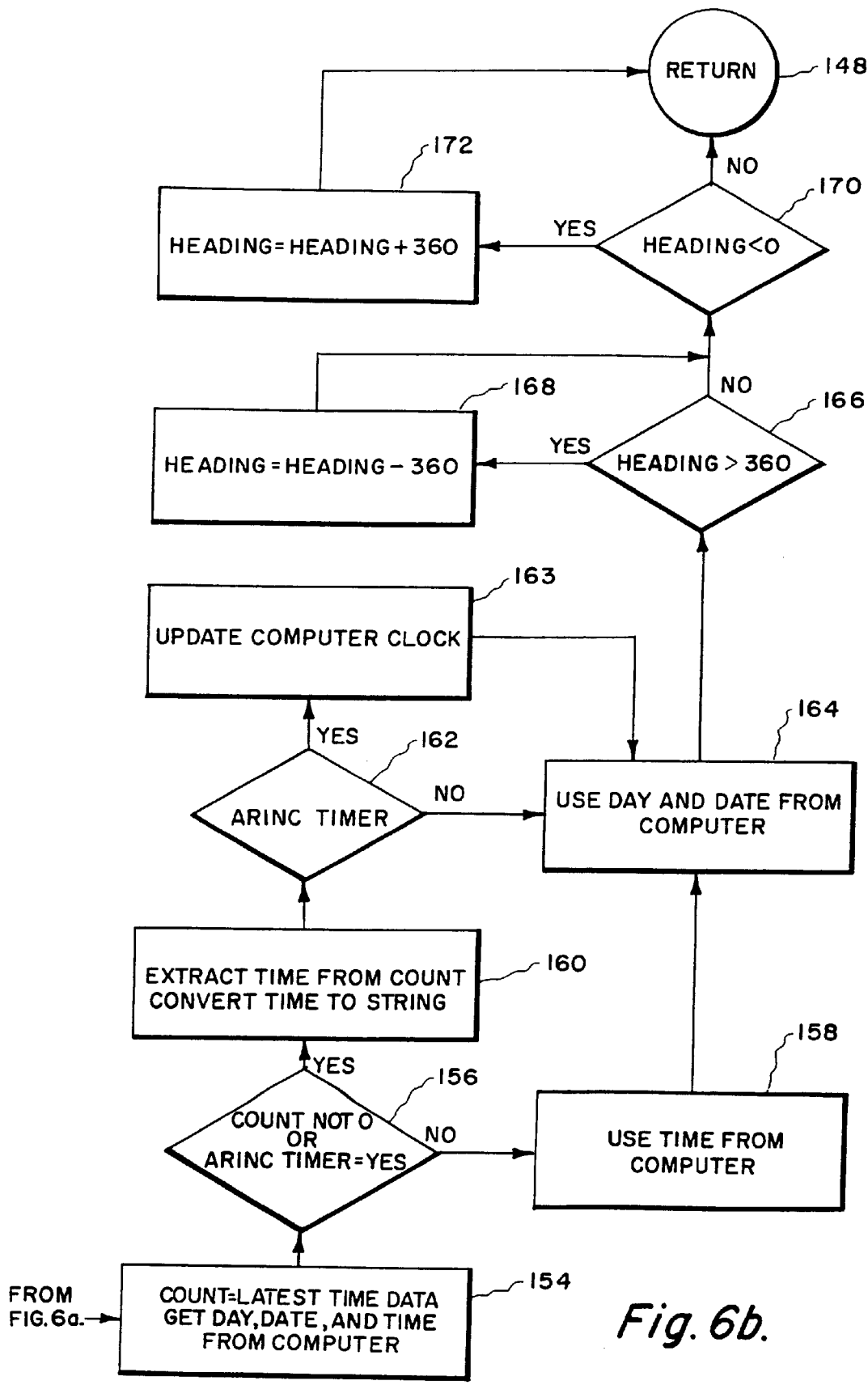

Referring to FIGS. 1, 2 and 5 the module INIT.C is the software module which initializes all Airborne Video Tracking System Computer interfaces, initializes waypoints, initializes Analog to Digital and Digital to Analog boards in system 20.

During program step 130 certain global variables within the INIT.C module are set. Tracking is set to use acquisition sight 22 as the means for acquiring target 37. When waypoint tracking is being used by airborne video tracking system 20 the waypoint is preset to waypoint one which for the waypoint screen illustrated above is Mustang Island at an altitude of 4 feet. The estimated altitude is initially set to zero. A "designated_point.alt" is undefined. The "designated_point.alt" is used with the triangulation calculation for determining the location of a target. The serial number is set for the particular computer which is to be used to run the software.

When the serial number of the computer does not match the serial number in the software the program is aborted (program steps 132 and 146). When the serial number of the computer matches the serial number in the software the program loads data from the file setup.cal which is the calibration file for all devices connected to computer 42 (program step 134). During program step 135, the software next initializes the waypoints from the file WAYPOINT.DAT.

During program step 136 the displays including monitor 47, wide field of view monitor 46 and narrow field of view monitor 48 are initialized. During program step 137 the flight path data is read. During program step 138 the serial ports for video tape recorders 50 and 52 are initialized allowing for communication with wide field of view recorder 50 and narrow field of view recorder 52. In addition, the serial port for the output NEMA protocol is initialized.

During program step 140 an analog input/output board is initialized allowing analog data from track handle 38, automatic video tracker 40 or acquisition sight 22 to be read by computer 42. The analog signal from gimbal interface 58 is also read through this input/output board.

During program step 142 the INS board in computer 42 which couples inertial navigation system 30 to computer 42 is initialized. It should be noted that the inertial navigation system board is an "ARINC 429" interface board within computer 42. The signals from inertial navigation system 30 are signals having a digital format.

During program step 144 the SYNCHRO board which couples infrared display system 34 to computer 42 is initialized. It should be noted that the infrared display system board is a "Synchro" interface board within computer 42 which converts synchro data to digital data. It should also be noted that roll and pitch data may be provided through the "Synchro" interface board.

During program step 145 the NEMA input interrupt port is initialized to allow computer 42 to read GPS data without losing characters. The MS-1553 Interface to infrared display system 34 is initialized (program step 147). Program step 148 is the return step.

As shown in FIG. 2 terminal 43 is the input terminal for synchro data from infrared display system 34, while terminal 45 is the input terminal for ARINC 429 data from inertial navigation system 30.

Referring to FIGS. 1, 2, 6a and 6b, the module INS.C is utilized to input the aircraft location and orientation from inertial navigation system 30 including the aircraft latitude, longitude and altitude and the aircraft roll, pitch and heading. During program step 151 updated latitude data for the aircraft is obtained from inertial navigation system 30 or an external Global Positioning System and the latitude is then extracted from the latitude data. During program step 153 updated longitude data or the external Global Positioning System for the aircraft is obtained from inertial navigation system 30 and the longitude is then extracted from the longitude data. During program step 155 updated altitude data for the aircraft is obtained from inertial navigation system 30 or the external Global Positioning System and the altitude is then extracted from the altitude data.

The platforms or aircraft which use tracking system generally receive position data from an external Global Positioning System. Whenever the platform does not receive position data from Global Positioning System, the software for tracking system 20 defaults to the inertial navigation system For the wide field of view illustrated in FIG. 3 the aircraft latitude is North 34 degrees 6.40 minutes, the aircraft longitude is West 119 degrees 6.50 minutes and the aircraft altitude is 28000 feet.

During program steps 157, 159, 150 and 152 aircraft roll, pitch, heading and ground speed data is obtained from the inertial navigation system 30. The monitor 47 at operator console 24 displays the aircraft roll, pitch and heading in degrees. The wide field of view monitor 46 displays the aircraft heading in degrees and the aircraft speed in miles per hour. For the wide field of view illustrated in FIG. 3 the aircraft heading is 260 degrees and the aircraft speed is 200 miles per hour.

During program steps 154 the latest time, date and day is obtained from computer 42. If communication between computer 42 and inertial navigation system 30 is established, then time is obtained from inertial navigation system 30 (program step 160). However, when communication between computer 42 and inertial navigation system 30 is not established, then time is obtained from computer 42. During program step 163 the computer clock is updated to the time provided by inertial navigation system 30.

During program step 166, 168, 170 and 172 the heading is corrected to provide for a positive angle between 0 degrees and 360 degrees. When the heading provided by inertial navigation system 30 is greater than 360 degrees then 360 degrees is subtracted from the heading to provide a corrected heading (program steps 166 and 168). When the heading provided by inertial navigation system 30 is less than 0 degrees, 360 degrees are added to the heading to provide a corrected heading (program steps 170 and 172).

Figure 7:
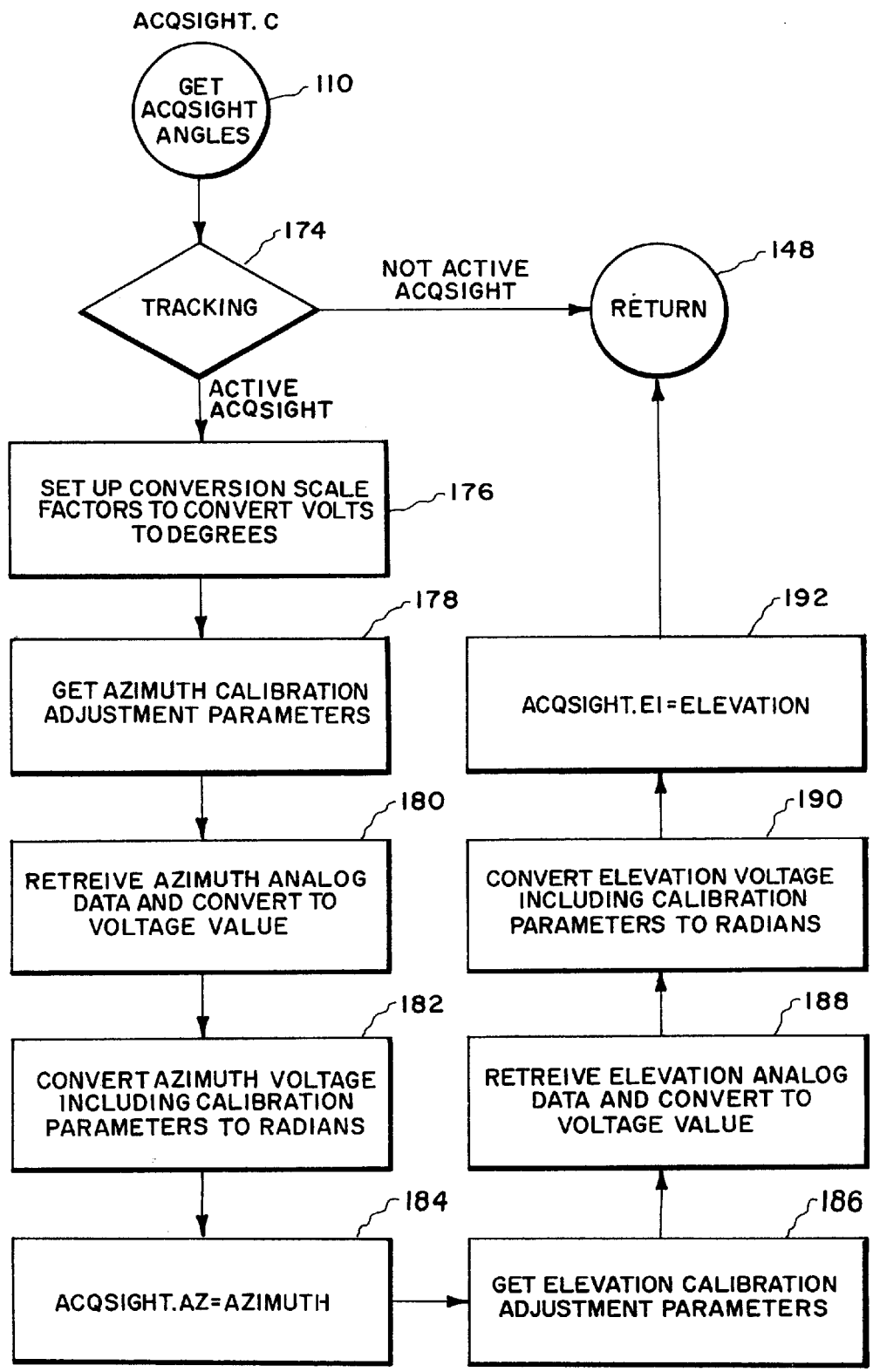
FIG. 7 is a flow chart for the acquisition sight program module acqsight.c.
Figure 8A:
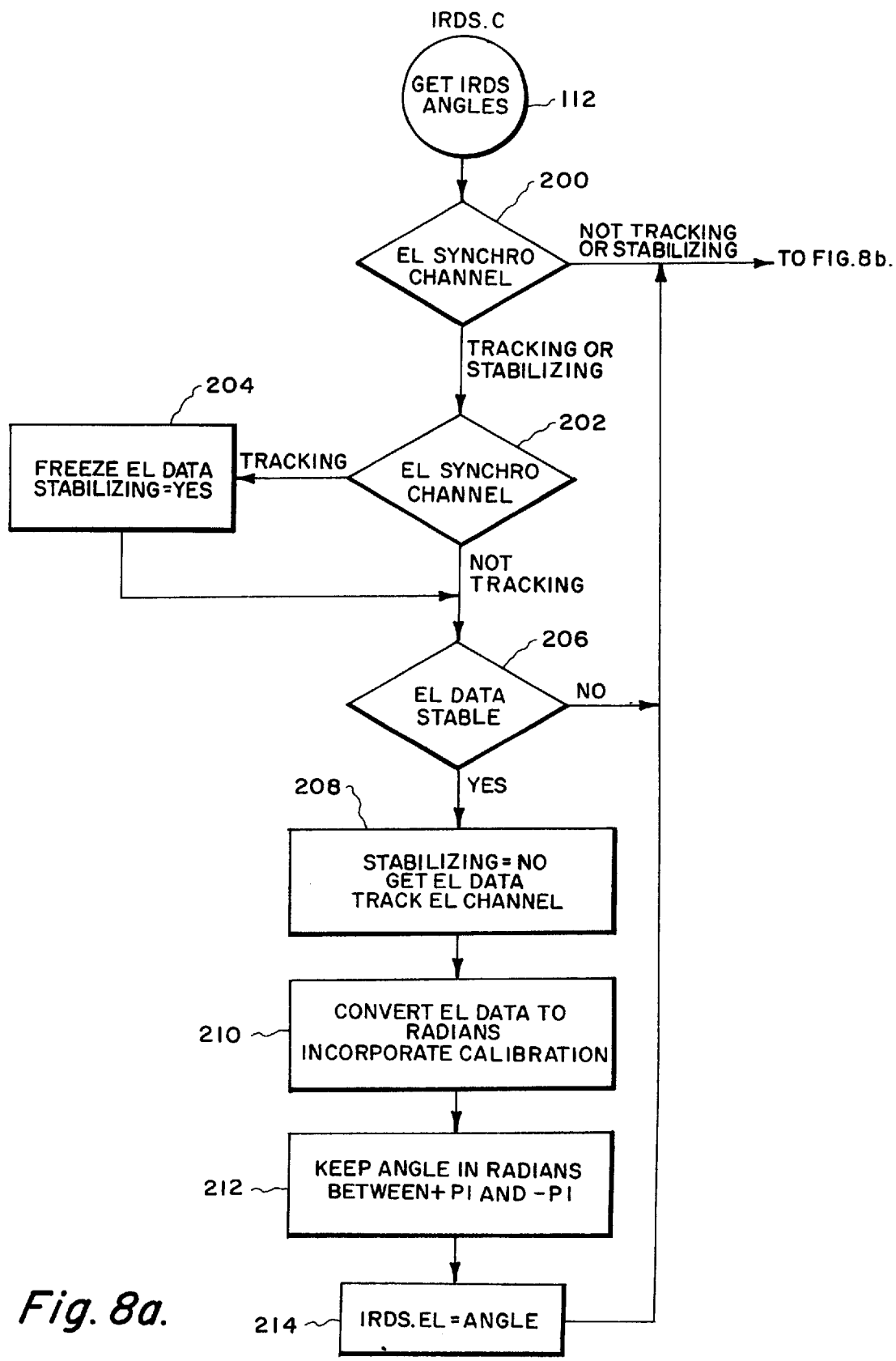
FIGS. 8a and 8b are a flow chart for the infrared display system program module irds.c.
Figure 8B:
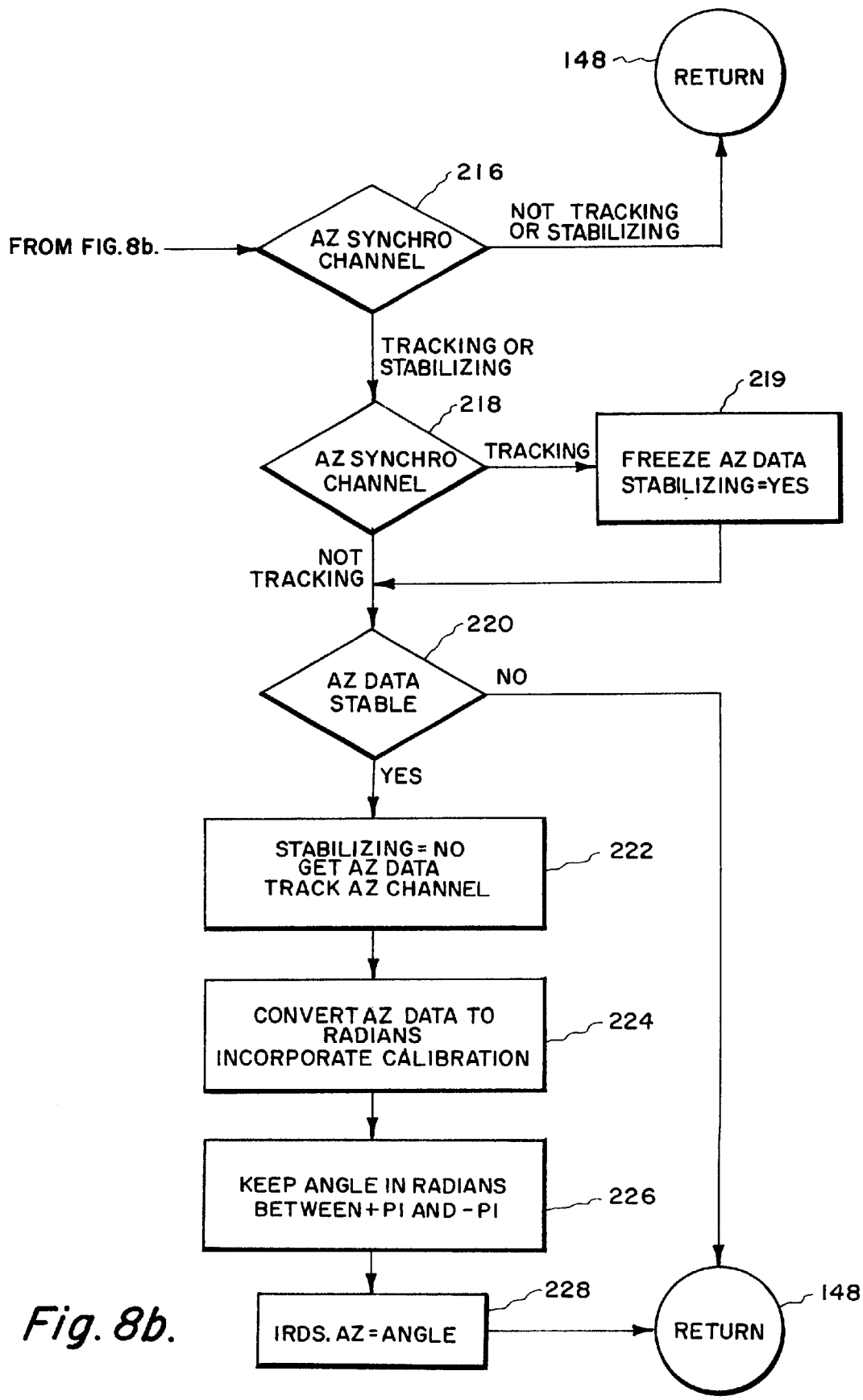

Referring to FIGS. 1, 2 and 7, the module ACQSIGHT.C is utilized to input the acquisition sight angles (azimuth and elevation) for acquisition sight 22 as well as track handle 38 and automatic video tracker 40. The tracking mode is examined during program step 174. If tracking is performed by waypoint or the infrared display system 34 then the software returns to the main program. When, however, acquisition sight 22 is being used to track target 37 position data is obtained from the analog voltages provided by acquisition sight 22 to computer 42.

During program step 176 there is a set up of conversion scale factors to convert volts to degrees for both azimuth and elevation. During program step 178 the conversion scale factors of program step 176 are modified or adjusted to convert azimuth volts to radians. During program step 180 the azimuth analog data is retrieved from an A/D board within computer 42 and then converted to a voltage value. This azimuth analog data is a count representative of the azimuth analog voltage signal from acquisition sight 22. During program step 182, the azimuth analog data with adjustments is converted to an angle in radians. During program step 184, the value acqsight.AZ is established as the azimuth angle in radians for use by gimballed mirror 56 and other functions of airborne video tracking system 20.

It should be noted that computer 42 reads an azimuth analog value from track handle 38, acquisition sight 22 or automatic video tracker 40 and then converts this azimuth analog value to an azimuth angle in radians which is supplied as a voltage to gimballed mirror 56 to point mirror 56 to target 37. It should also be noted that the identical procedure is used to provide the elevation angle in radians to gimballed mirror 56 (program steps 186–192).

Referring to FIGS. 1, 2, 8a and 8b, the module IRDS.C inputs the Infrared Display System angles (azimuth and elevation) from system 34. Infrared display system 34 provides azimuth and elevation data in a synchro or sinusoidal format via a pair of channels through a synchro board in computer 42. Each channel can be in a tracking mode, a stabilizing mode or a non-tracking mode. During program step 202 the elevation channel is sampled to determine if the channel is tracking or stabilizing. If the elevation channel is not tracking or stabilizing then computer 42 can not read the elevation data and the software proceeds to program step 216 to sample the azimuth channel. If the elevation channel is tracking (program step 202) then the software of the IRDS.C module freezes the elevation channel data (program step 204). During program step 206 a test is made to determine if the data is stable. If the elevation channel data is not stable then the software of the IRDS.C module proceeds to program step 216.

When the elevation channel data is stabilized the tracking flag is set to no indicating that the data is stabilized. The elevation channel is retrieved and the elevation channel is next set to a tracking mode to obtain another sample of elevation data. During program step 210, the elevation data is then converted directly to an angle in radians. The elevation angle is kept in radians between +180 degrees and −180 degrees (program step 212). The calculated value for the elevation angle is set to irds.EL during program step 214. The azimuth channel data from infrared display system 34 is processed in exactly the same manner as the elevation channel data during program steps 216–228.

Figure 9:
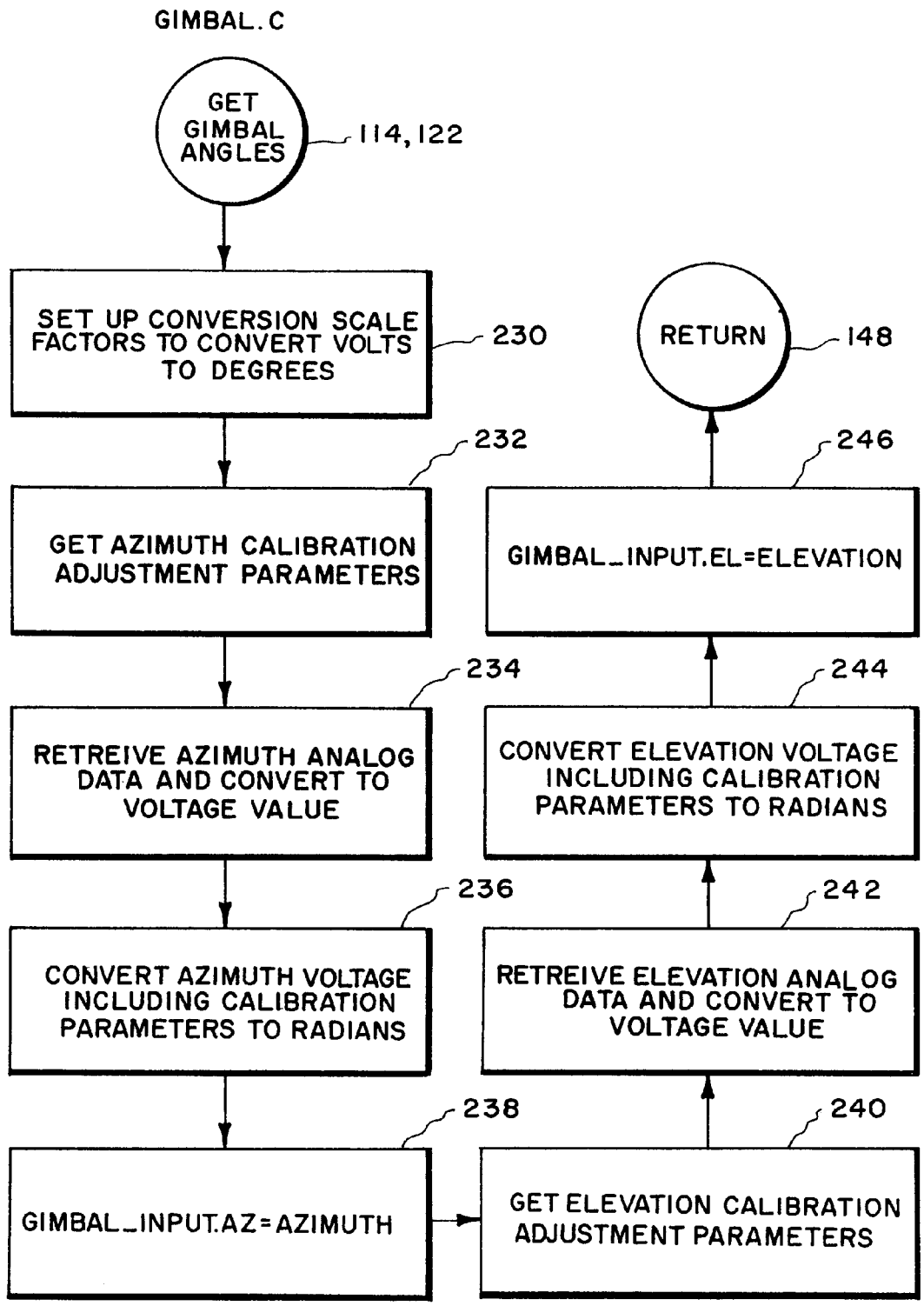
FIG. 9 is a first flow chart for the gimbal program module gimbal.c.

Referring to FIGS. 1, 2 and 9, the module GIMBAL.C is utilized to input the Line of Sight of the gimballed mirror 56 (azimuth and elevation). During program step 230 there is a set up of conversion scale factors to convert volts to degrees for both azimuth and elevation gimbal angles. During program step 232 the conversion scale factors of program step 230 are modified or adjusted to convert azimuth volts to radians. During program step 234 the azimuth analog data is retrieved from the A/D board within computer 42 and then converted to a voltage value. This azimuth analog data is a count representative of the azimuth analog voltage signal from gimballed mirror 56. During program step 236, the azimuth analog data for gimballed mirror 56 with adjustments is converted to an angle in radians. The azimuth angle is set equal to the gimbal_input.Az variable. The gimballed mirror analog elevation data is processed in exactly the same manner as the gimballed mirror analog azimuth data (program steps 240–246). Once the azimuth and elevation angles for gimballed mirror 56 are converted to radians, the location of gimbal position indicator 95 and 96 are set on wide field of view monitor 46.

Figure 10:
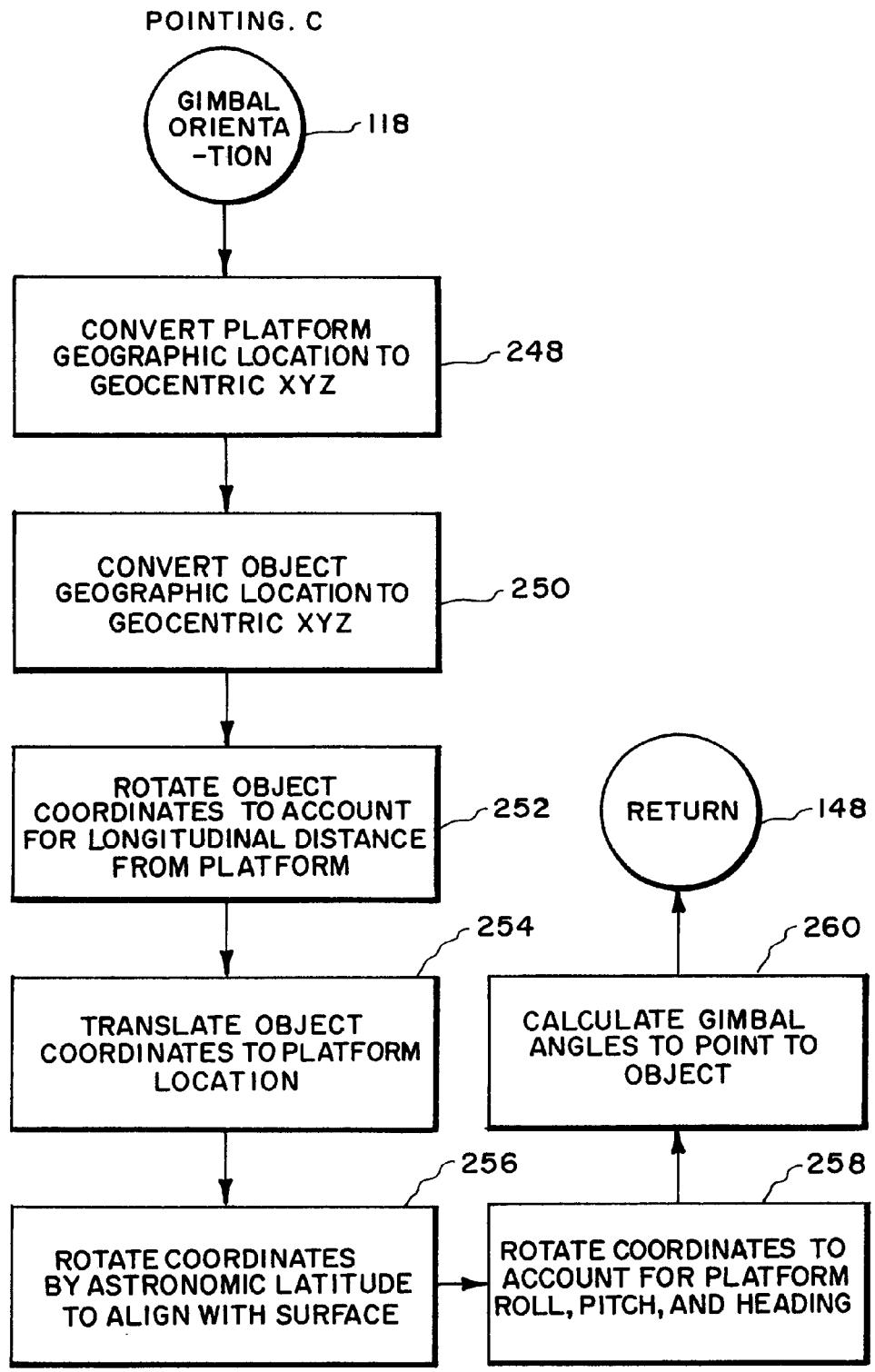
FIG. 10 is a flow chart for the waypoint tracking module pointing.c.

Referring to FIGS. 1, 2 and 10, when tracking is by waypoint or the fixed position of an object on the ground, the azimuth and elevation angles for pointing gimballed mirror 56 at the waypoint are determined in the pointing.c module. During program step 248 the aircraft's geographic location (latitude, longitude and altitude) is converted into a geocentric XYZ coordinate location with the earth's center being the origin for the X, Y and Z axis. During program step 250 the object or waypoint's geographic location is converted into a geocentric XYZ coordinate location. The waypoints coordinates are rotated to account for longitudinal distance from the aircraft to the waypoint in program step 252. The aircraft is now located at Y equal to zero.

The aircraft coordinates are set to 0,0,0 to establish a new coordinate system to describe the waypoint with respect to the aircraft (program step 254). The coordinate system is then rotated to align the aircraft with the surface of the earth (program step 256). During program step 258 the coordinate system is next rotated to account for the roll, pitch and heading of the aircraft. The azimuth and elevation angles for gimballed mirror 56 are calculated to point the gimballed mirror 56 to the target 37 during program step 260.

Figure 11:
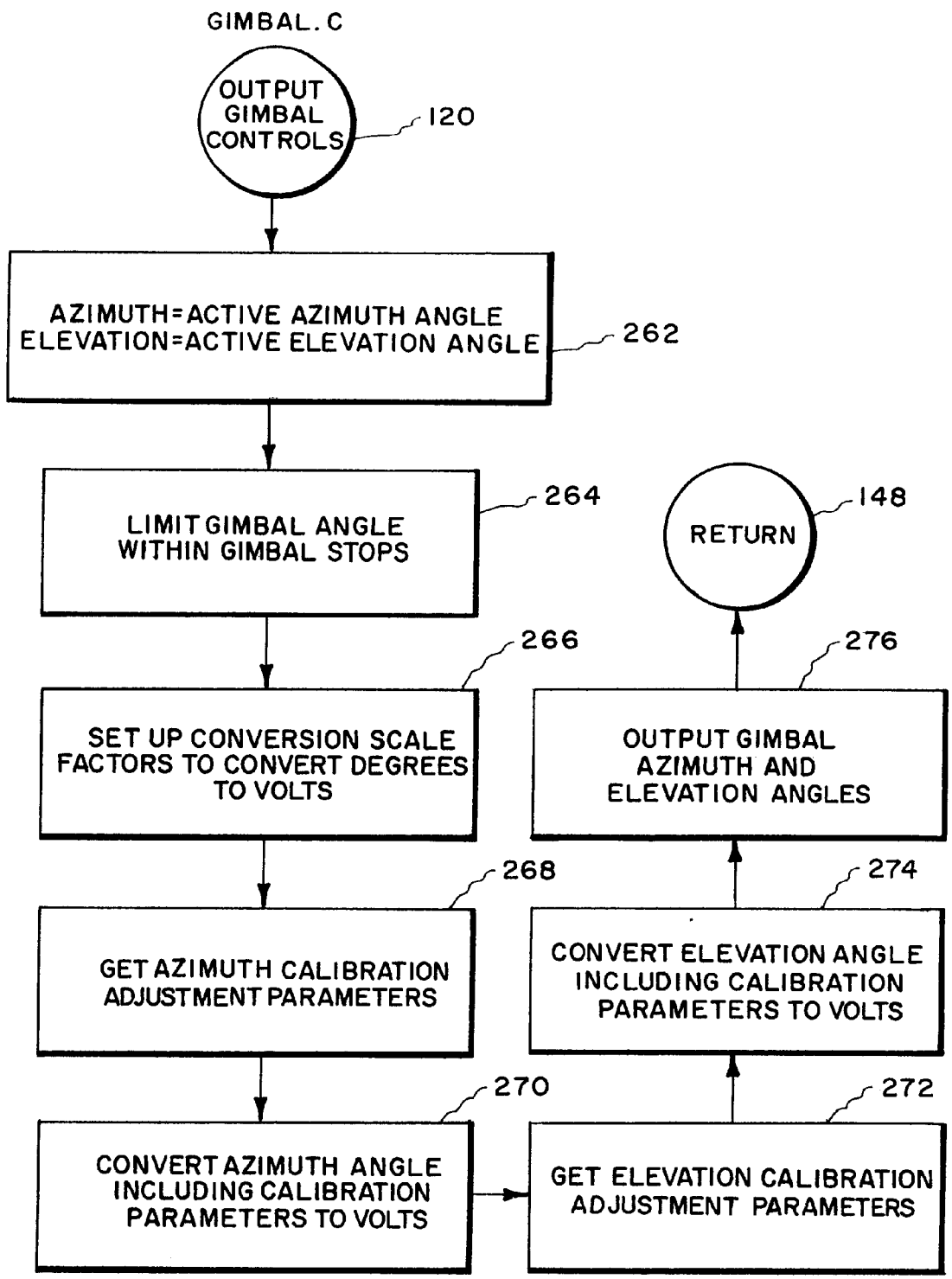
FIG. 11 is a second flow chart for the gimbal program module gimbal.c.
Figure 12A:
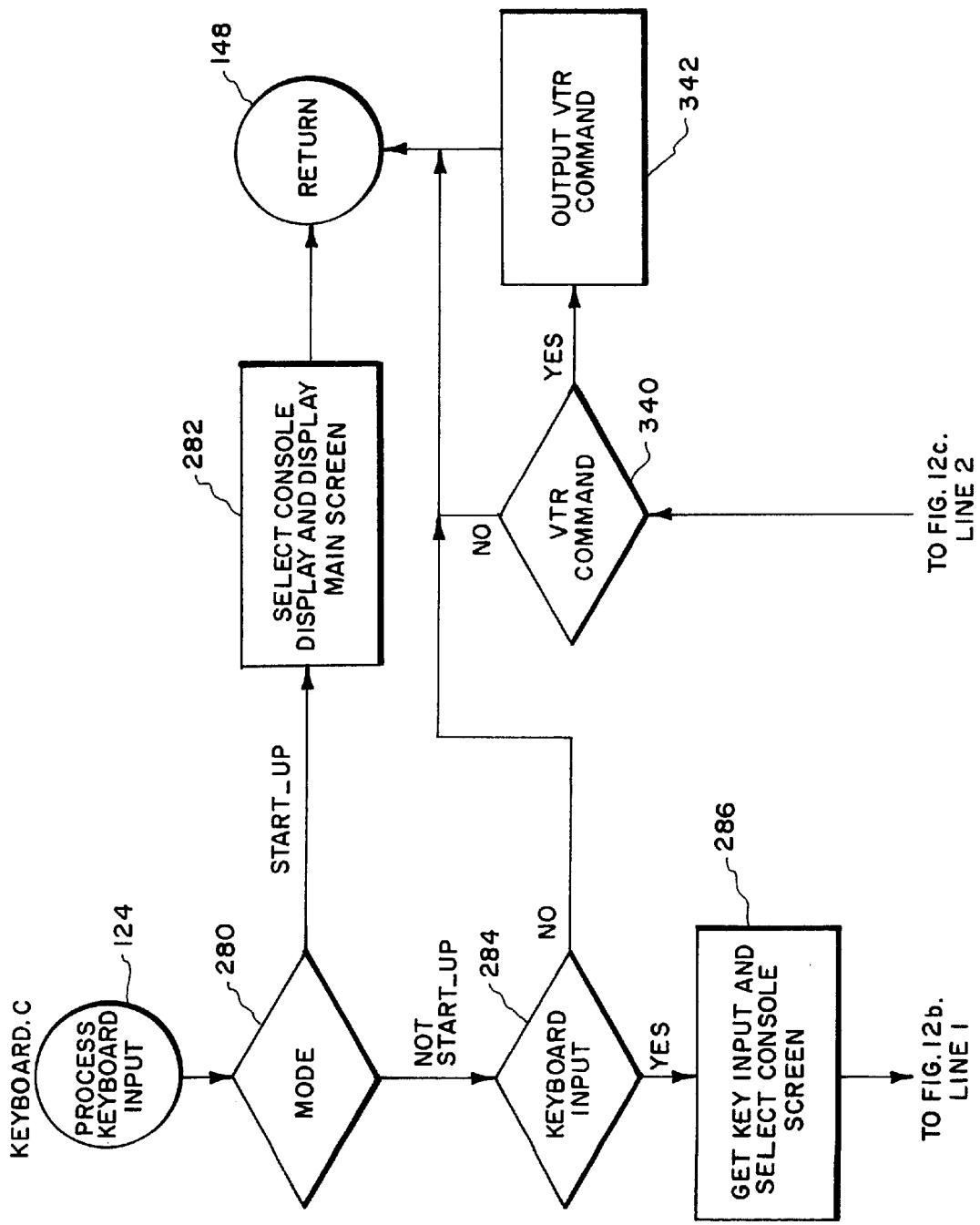
FIGS. 12a, 12b and 12c are a flow chart for the computer keyboard program module keyboard.c.
Figure 12B:
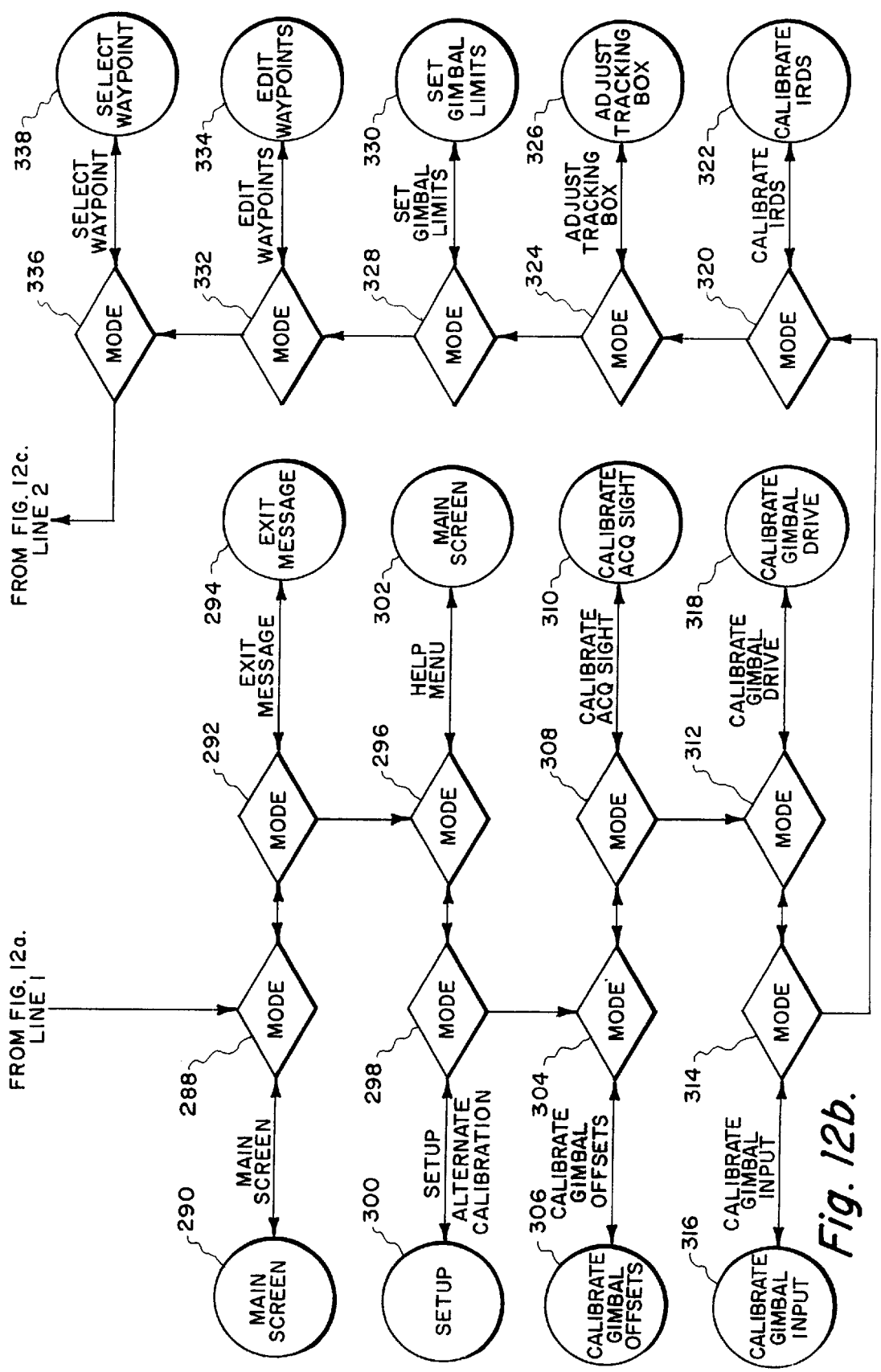
Figure 12C:
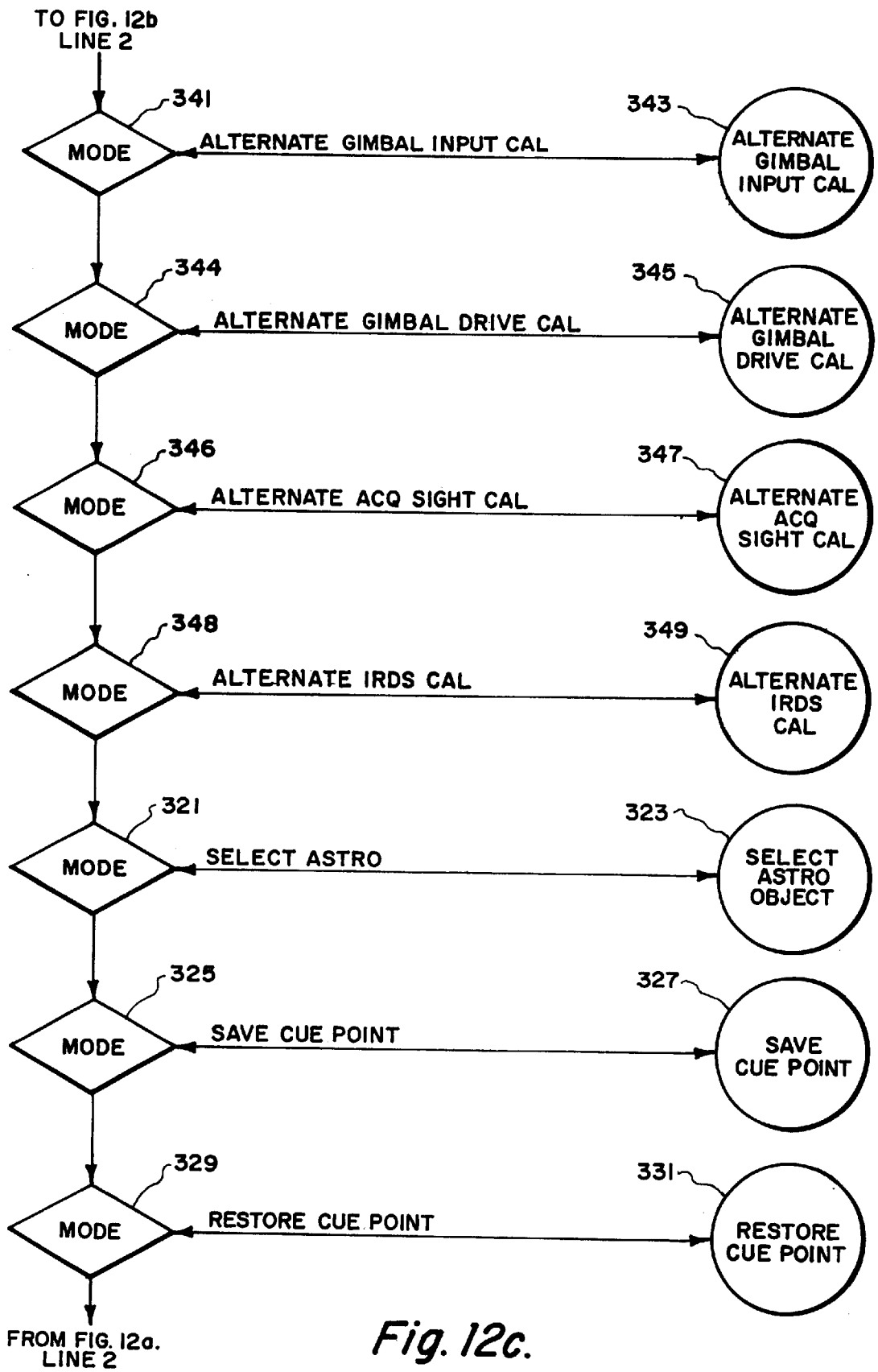

Referring to FIGS. 1, 2 and 11, the gimbal.c module is used to control the orientation of the gimballed mirror 56. A selection is made as to which input angles to output to the gimballed mirror 56 (program step 262). The infrared display system angles are irds.az and irds.el; the acquisition sight angles are acq_sight.az and acq_sight.el and the waypoint, cue point, flight path or astronomic object angles are pointing_output.az and pointing_output.el. During program step 264 there is a limit placed on gimbal travel to within the gimbal stops. During program step 266 conversion scale factors are set up for both azimuth and elevation to convert degrees to volts.

During program step 268 adjustment parameters to convert azimuth angular data to volts are retrieved. During program step 270 the azimuth angle in radians with adjustments is converted to volts. During program step 272 adjustment parameters to convert elevation angular data to volts are retrieved. During program step 274 the elevation angle in radians with adjustments is converted to volts. During program step 276 the gimbal azimuth and gimbal elevation angles in an analog signal format are output to gimbal interface 58. Gimballed interface unit 58 then steers gimballed mirror 56 to the target 37.

Referring to FIGS. 1, 2, 12a, 12b and 12c, the keyboard.c module is utilized to process keyboard input from the operator at operator console 24. During program step 280 a determination is made as to whether the mode for airborne video tracking system 20 is the startup mode. If the mode is the startup mode then monitor 47 is selected and the main screen menu is displayed during program step 282. However if the mode is not the startup mode then the software proceeds to program step 284 to sample the input from keyboard 41. If the operator has not used a key on the keyboard 41 to select a particular console display, then the program returns to the main program function.

During program step 286 the key input is retrieved and the corresponding console screen is displayed. The various modes are entered by the operator via the function and numeral keys on keyboard 41. For example, if the operator at operator console 24 enters (1) the F2 function key or (2) the ALT key simultaneously with the F2 key (ALTERNATE CALIBRATION) the setup screen will be appear on monitor 47 (program step 300). After the operator accesses the setup screen, the operator can calibrate the gimbal offsets by depressing the one key on keyboard 41 (program step 306). This calibration compensates for the misalignment in pitch of tracking system 20 and inertial navigation system 30 with respect to the aircraft frame.

When the operator at operator console 24 enters the F8 function key the select waypoint screen will appear on monitor 47 (program step 338). When the operator at operator console 24 enters the "8" key from the setup screen the edit waypoint screen will appear on monitor 47 (program step 334). When the operator at operator console 24 enters the "6" key from the setup screen the adjust tracking box screen will appear on monitor 47 (program step 326).

When the operator utilizes the alternate calibration function of the keyboard.c module, computer 42 will perform the required processing functions to automatically calibrate the analog signals (azimuth and elevation angles) received by computer 42 from the interface unit 58 of gimballed mirror 56 (program step 343). Computer 42 will also perform the required processing functions to automatically calibrate the analog signals (azimuth and elevation angles) supplied to the interface unit 58 of gimballed mirror 56 (program step 345) to steer gimballed mirror 56. Further, computer 42 will perform the required processing functions to automatically calibrate acquisition sight 22 (program step 347) and to automatically calibrate infrared display system 34 (program step 349). In addition, computer 42 will perform the required processing functions to select an astronomic object (program step 323) as the active pointing device, save a cue point into the CUEPOINT.DAT file (program step 327) and restore the cue point (program step 331).

Figure 13A:
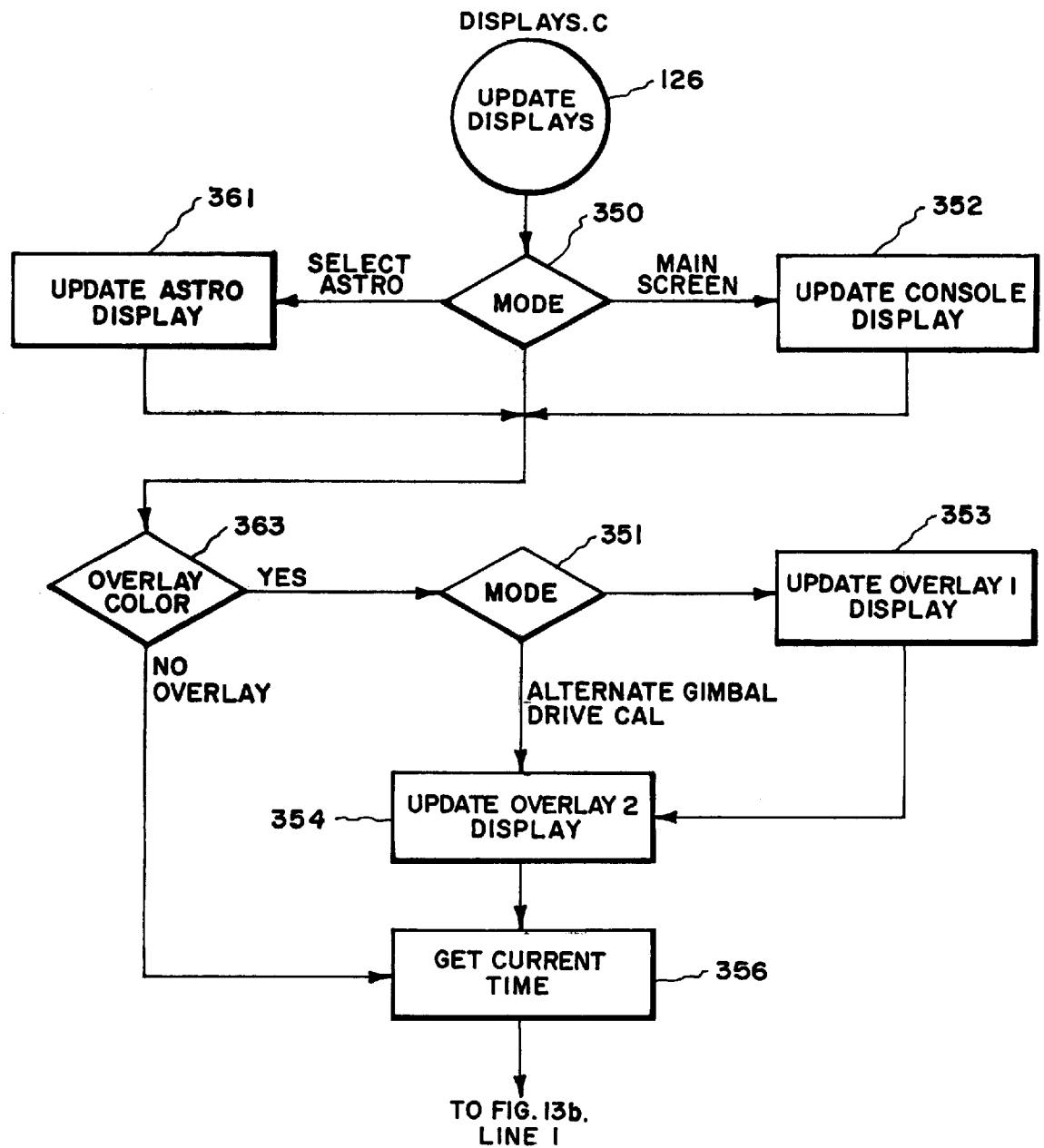
FIGS. 13a and 13b are a flow chart for the tracking system displays program module displays.c.
Figure 13B:
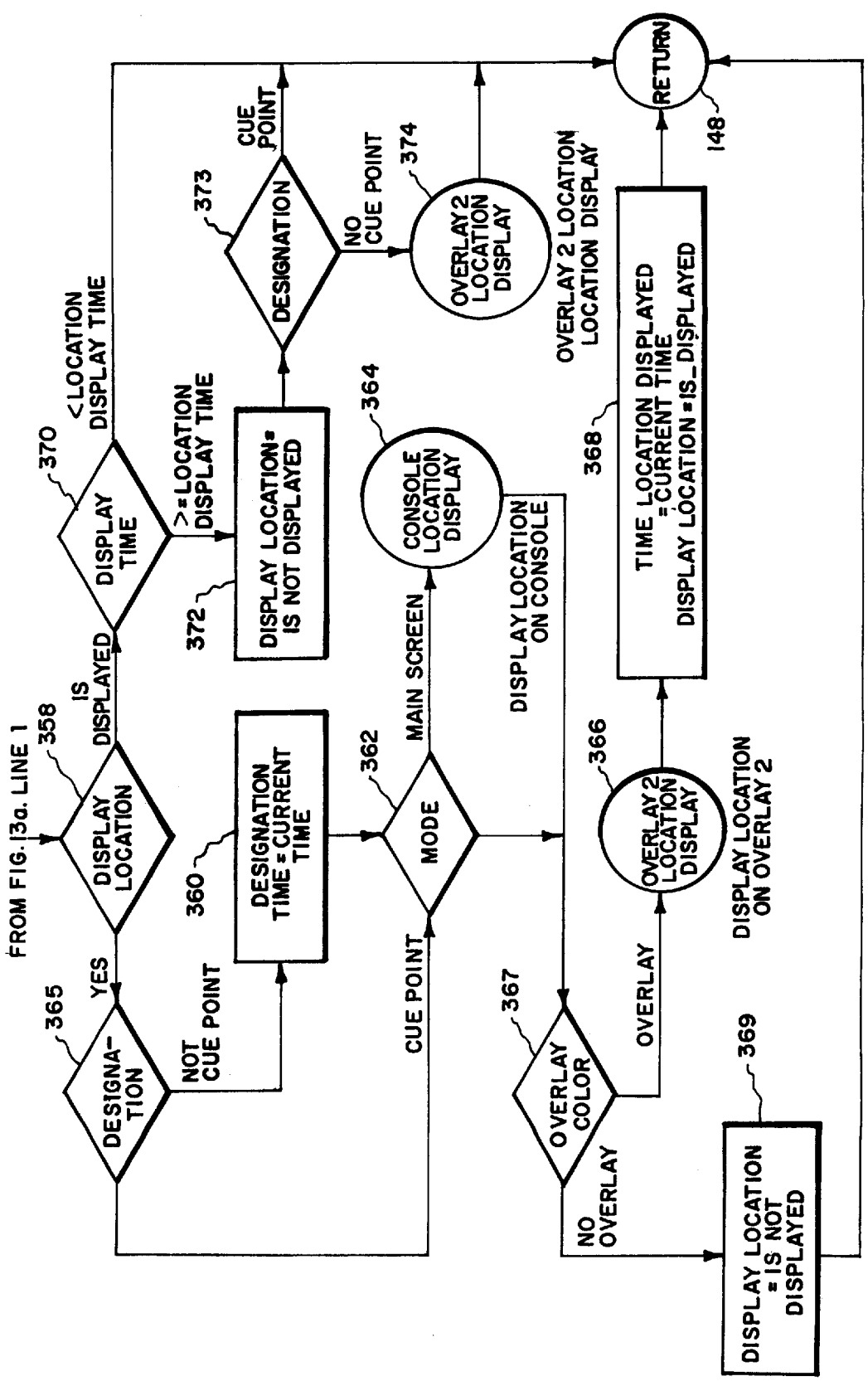

Referring to FIGS. 1, 2 and 13, the displays.c module in the software of Appendix A controls the displays in airborne video tracking system 20. If the mode is main screen the console display provided by monitor 47 is updated (program step 352). This update includes the aircraft latitude, longitude, altitude, speed, heading, roll and pitch.

If the mode is select astro, the astronomic display is updated (program step 361) to reflect change in the location of the astronomic object with respect to time.

Whenever there is an overlay color (program step 363) an overlay is being displayed. The software then proceeds to program step 351 to determine the mode which indicates whether to update overlay one (program step 353) or proceed to program step 354.

The display for the wide field of view monitor 46 (FIG. 3) is updated during program step 353. The display for the narrow field of view monitor 48 is updated during program step 354. When computer 42 is processing the alternate gimbal drive calibration the display for the wide field of view monitor 46 (FIG. 3) is not updated, that is program step 353 is skipped. The overlay1 display in the software is the wide field of display, while the overlay 2 display in the software is the narrow field of display.

Whenever there is not an overlay display, the software proceeds directly to program step 356. The current time is read from computer 42 during program step 356. During program step 358 a display location flag is checked. Whenever display location is "yes" a test is made to determine the designation which may be (1) marked target, (2) triangulated target or (3) a cue point. If the designation is a cue point designation the time is obtained from the cue point buffer and program step 360 is skipped. If the designation is not a cue point the designation time is set equal to the current time. The designated time is the time that the target was designated for display. In the marked target box and the narrow field of view display the designated time is 166:16:25:05. The real time shown in the narrow field of view display is 166:16:29:17.

During program step 362 the mode is again tested. If the software is in the main screen mode then monitor 47 displays the target location in the marked target box during program step 364. If the mode is not main screen then the software proceeds to program step 367. Whenever there is not an overlay color (program step 367) the software proceeds to program step 369 which sets the display location variable to indicate that the display location is not displayed. The software next proceeds to program step 148 which is the return function.

Whenever there is an overlay color, the software proceeds to program step 366 to display the overlay 2 location. When program step 358 is a yes, target data is being displayed. Target 37 position information including latitude, longitude, altitude and designated target time is displayed on the narrow field of view monitor 52 during program step 366. During program step 368 the display location flag is set equal to IS_DISPLAYED to indicate that target position information is being displayed. The time displayed is set equal to the current time.

If the display location flag is set to IS_DISPLAYED, then the display time (designated target time) is tested. If the display time is greater than ten seconds the display location flag is set to IS NOT DISPLAYED (program step 372). The software next proceeds to program step 373 to determine if the designation is a cue point (program step 373). Whenever the designation is not a cue point the software proceeds to program step 374. The overlay 2 location display routine is called. The marked target display is then cleared from narrow field of view monitor 48 with only the current time being overlaid on the monitor.

Whenever the designation is a cue point then the software exits the displays.c module since a cue point location is not displayed on the overlays. The marked and triangulated targets are displayed on the overlays.

Figure 14:
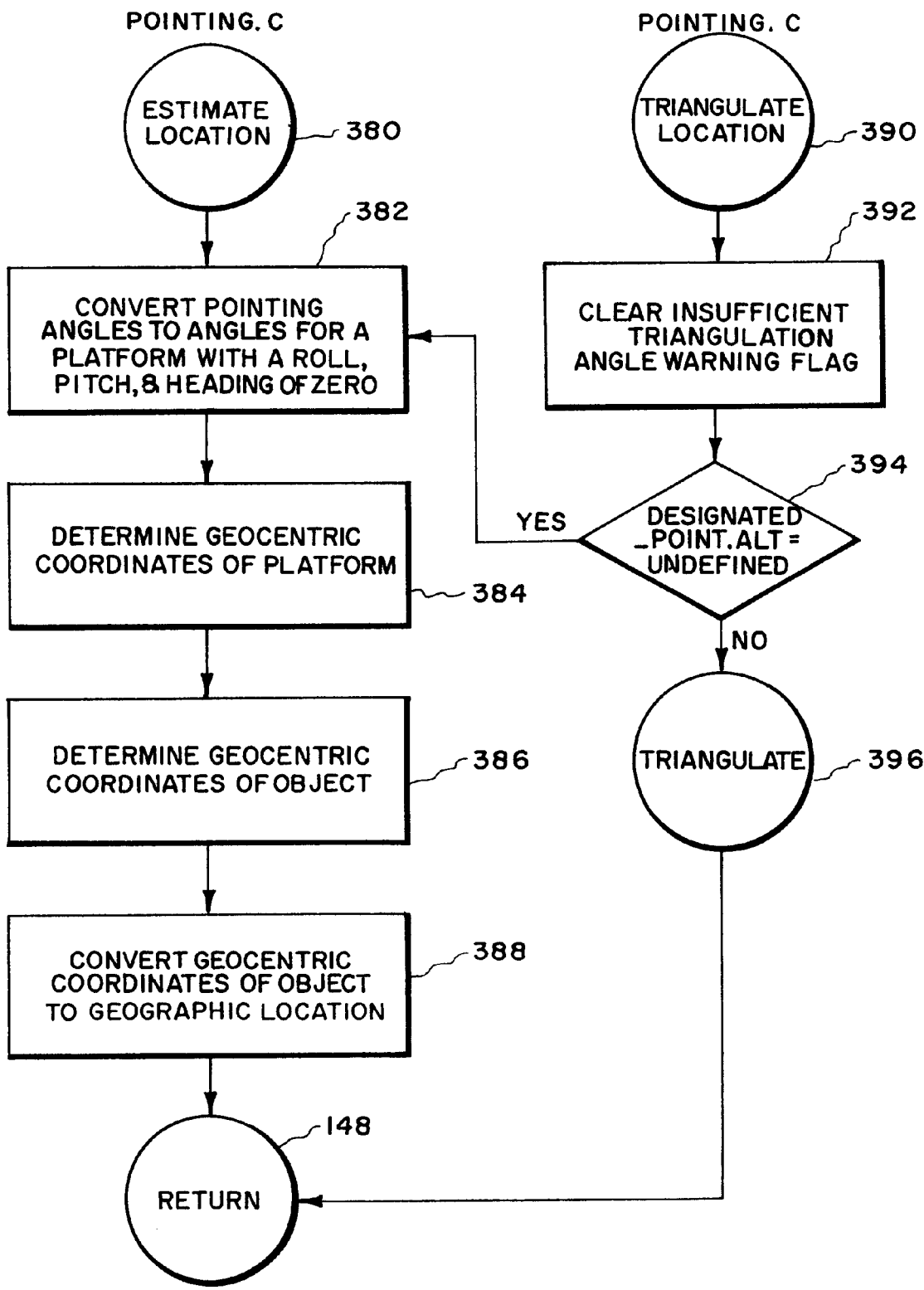
FIG. 14 is a flow chart for the estimate location function and the triangulation function of the program module pointing.c.

Referring to FIGS. 1, 2 and 14, the estimate location function for the target is within the POINTING.C module. When the operator depresses the F10 function key on keyboard 41, computer 42 determines or calculates the latitude and longitude of target 37 from the pointing angles (azimuth and elevation angles) from gimballed mirror 56 and the estimated altitude of target 37 provided by the operator at operator console 24. During program step 382, the pointing angles are converted to angles for a platform with a roll, pitch and heading of zero. During program step 384 the geocentric coordinates of the aircraft are determined, that is the coordinate system for the aircraft is now an XYZ coordinate system.

During program step 386 the geocentric coordinates of the target 37 are determined, that is the coordinate system for the target is now an XYZ coordinate system. This determination is a mathematical determination. Target 37 is assumed to reside on the surface of an ellipsoid. The surface of the ellipsoid resides at the estimated altitude above the surface of the earth. The intersection of the line of sight vector with the surface of the ellipsoid establishes the geocentric coordinates of the target 37 or the object. The geocentric coordinates of the object are next converted to a geographic location in program step 388 (latitude and longitude of target 37).

The pointing.c module also includes a triangulation function which is accessed by depressing the F9 function key on keyboard 41. To utilize the triangulation function the operator must designate one location point for the target meaning that the operator must provide an estimated altitude and then utilize the F10 key on keyboard 41 to allow computer 42 to calculate an estimated latitude and longitude for target 37. This establishes a reference vector for target 37. During program step 394 a determination is made as to whether one location point for the target 37 has been designated. If one location point has been designated the software proceeds to program step 396 to perform the triangulation function.

At this time it should be noted that all function keys except F1 or F8 may be utilized from any screen appearing on monitor 47. Thus, for example, the operator may depress the function key F9 or the function key F10 on keyboard 41 while the setup screen is displayed on monitor 47. Once the operator at operator console 24 estimates the altitude of target 37 by entering the altitude via keyboard 41, the operator can then use the F9 or F10 key to provide an initial designation for the location of target 37, which is used to establish the reference vector for the target. Computer 42 also uses the aircraft location (latitude, longitude and altitude) and orientation (roll, pitch and heading), and the azimuth and elevation angles of gimballed mirror 56 to calculate the reference vector. The altitude entered by the operator may be positive which is above sea level or negative which is below sea level.

The operator then utilizes the F9 key to obtain a second line of sight vector for target 37 which is calculated from the aircraft's current location (latitude, longitude and altitude) and orientation (roll, pitch and heading), and the azimuth and elevation angles of gimballed mirror 56. The two line of sight vectors are then used to calculate the current latitude, longitude and altitude of target 37. By continuing to use the F9 key and thereby continuing to use the triangulation function of the pointing.c module, the operator can accurately determine the latitude, longitude and altitude of target 37.

For all subsequent triangulation functions computer 42 uses the previous location of target 37 and the current location and orientation of the platform or aircraft and the gimballed angles.

It should be noted that whenever an operator attempts to triangulate without sufficient change in the line of sight to allow for triangulation a warning message is provide to the operator and computer 42 does not process the triangulation function.

From the foregoing, it may readily be seen that the present invention comprises a new, unique and exceedingly useful tracking system which constitutes a considerable improvement over the known prior art. Many modifications and variations of the present invention are possible in light of the above teachings. It is to be understood that within the scope of the appended claims the invention may be practiced otherwise than as specifically described.

what is claimed is:

1. An airborne video tracking system for establishing and maintaining a line of sight to a moving target, said airborne video tracking system being mounted within an aircraft, said airborne video tracking system comprising:

an acquisition sight positioned within said aircraft, said acquisition sight allowing a pilot of said aircraft to acquire and begin tracking said moving target, said acquisition sight having a newton ring, said moving target being acquired when said pilot observes said moving target within the newton ring of said acquisition sight, said acquisition sight providing first analog position signals indicative of azimuth and elevation sight angles for said acquisition sight when said acquisition sight is tracking said moving target;

a track handle positioned within said aircraft, said track handle having a trigger switch, said track handle allowing an observer within said aircraft to take control of tracking said moving target from said pilot when said observer activates said trigger switch, said track handle providing second analog position signals indicative of azimuth and elevation sight angles for said track handle when said track handle is tracking said moving target;

a computer connected to said acquisition sight to receive said first analog position signals from said acquisition sight and said track handle to receive said second analog position signals from said track handle, said computer processing said first analog position signals and said second analog position signals to generate gimbal orientation signals;

a gimballed mirror having a gimbal interface, said gimbal interface being connected to said computer to receive said gimbal orientation signals from said computer, said gimbal interface responsive to said gimbal orientation signals steering said gimballed mirror to said moving target to establish and then maintain said line of sight to said moving target;

said gimballed mirror receiving image forming light from said moving target and then redirecting said image forming light along a first light path;

a first turning mirror positioned on said first light path to receive a portion of said image forming light from said gimballed mirror and then direct the portion of said image forming light received thereby along a second light path;

a first video camera positioned on said second light path to receive said image forming light directed along said second light path by said first turning mirror, said first video camera responsive to said image forming light received from said first turning mirror generating a first video signal;

a first video monitor connected to said first video camera to receive said first video signal, said first video monitor responsive to said first video signal displaying a wide field of view scene including said moving target, said first video monitor being positioned within said aircraft to allow said observer to monitor said moving target when said observer is using said track handle to track said moving target;

a second turning mirror positioned on said first light path downstream from said first turning mirror, said second turning mirror receiving a remainder of said image forming light from said gimballed mirror and then directing the remainder of said image forming light received thereby along a third light path;

a zoom telescope positioned on said third light path to receive said image forming light directed along said third light path by said second turning mirror, said zoom telescope modifying said image forming light to define a narrow field of view scene;

a second video camera positioned downstream from said zoom telescope on said third light path to receive said image forming light from zoom telescope, said second video camera responsive to said image forming light received from said zoom telescope generating a second video signal;

a second video monitor connected to said second video camera to receive said second video signal, said second video monitor responsive to said second video signal displaying said narrow field of view scene, said narrow field of view scene having said moving target displayed therein whenever said gimballed mirror is aligned with said line of sight to said moving target, said second video monitor being positioned within said aircraft to allow said observer to monitor said moving target when said observer is using said track handle to track said moving target;

said computer containing a keyboard.c computer software module, said keyboard.c computer software module automatically calibrating said gimbal orientation signals;

a keyboard coupled to said computer, said keyboard having a plurality of alpha-numeric and function keys; and a third video monitor coupled to said computer, said third video monitor being positioned to allow said observer to monitor said third video monitor, said third video monitor displaying a plurality of calibration menus, each of said plurality of calibration menus having a set of calibration instructions, a first of said plurality of calibration menus being associated with calibrating said gimbal orientation signals;

the alpha-numeric and function keys of said keyboard first being utilized by said observer to access said set of calibration instructions for the first of said plurality of calibration menus associated with calibrating said gimbal orientation signals;

the alpha-numeric and function keys of said keyboard next utilizable by said observer to implement said set of calibration instructions for the first of said plurality of calibration menus associated with calibrating said gimbal orientation signals, said keyboard.c computer software module being activated to automatically calibrate said gimbal orientation signals when said observer implements said set of calibration instructions for the first of said plurality of calibration menus associated with calibrating said gimbal orientation signals;

an infrared display system positioned within said aircraft, said infrared display system being adapted to track said target, said infrared display system providing synchro signals indicative of azimuth and elevation sight angles for said infrared display system when said infrared display system is tracking said target;

said infrared display system being coupled to said computer to provide said synchro signals to said computer;

said third video monitor displaying a second of said plurality of calibration menus, the second of said plurality of calibration menus being associated with calibrating said synchro signals;

the alpha-numeric and function keys of said keyboard being used by said observer to access the set of calibration instructions for the second of said plurality of calibration menus, the alpha-numeric and function keys of said keyboard then being used by said observer to implement the set of calibration instructions for the second of said plurality of calibration menus, said keyboard.c computer software module being activated to automatically calibrate said synchro signals when said observer implements the set of calibration instructions for the second of said plurality of calibration menus;

a remote computer coupled to said computer, said remote computer being adapted to control operation of said infrared display system, said remote computer providing a command to said computer allowing said remote computer to control operation of said infrared display system.

2. The airborne video tracking system of claim 1 wherein said gimballed mirror comprises an approximately four inch mirror fabricated from beryllium, said gimballed mirror having a flatness of about lambda over ten.

3. The airborne video tracking system of claim 1 wherein said first turning mirror comprises a one inch turning mirror having a flatness of about lambda over ten.

4. The airborne video tracking system of claim 1 wherein said second turning mirror comprises a four inch turning mirror having a flatness of about lambda over ten.

5. The airborne video tracking system of claim 1 wherein said zoom telescope modifies said image forming light to provide a range from about 0.1 degree to about one degree for said narrow field of view scene.

6. The airborne video tracking system of claim 1 further comprising:

a first video recorder connected to said first video camera to receive said first video signal and record said first video signal; and a second video recorder connected to said second video camera to receive said second video signal and record said second video signal.

7. The airborne video tracking system of claim 1 wherein said computer contains a cuepoint data software file, said cuepoint data software file having a plurality of target locations stored therein, said operator accessing each of said plurality of target locations by using the alpha-numeric and function keys of said keyboard, the alpha-numeric and function keys of said keyboard allowing said operator to use a selected one of said plurality of target locations as an active pointing device to point said gimballed mirror at the selected one of said plurality of target locations.

8. An airborne video tracking system for establishing and maintaining a line of sight to a target, said airborne video tracking system being mounted within an aircraft, said airborne video tracking system comprising:

an acquisition sight positioned within said aircraft, said acquisition sight allowing a pilot of said aircraft to acquire and begin tracking said target, said acquisition sight having a newton ring, said target being acquired when said pilot observes said target within the newton ring of said acquisition sight, said acquisition sight providing first analog position signals indicative of azimuth and elevation sight angles for said acquisition sight when said acquisition sight is tracking said target;

a track handle positioned within said aircraft, said track handle having a trigger switch, said track handle allowing an observer within said aircraft to take control of tracking said target from said pilot when said observer activates said trigger switch, said track handle providing second analog position signals indicative of azimuth and elevation sight angles for said track handle when said track handle is tracking said target;

a computer connected to said acquisition sight to receive said first analog position signals from said acquisition sight and said track handle to receive said second analog position signals from said track handle, said computer processing said first analog position signals and said second analog position signals to generate gimbal angular pointing signals;

a gimballed mirror having a gimbal interface, said gimbal interface being connected to said computer to receive said gimbal angular pointing signals from said computer, said gimbal interface responsive to said gimbal angular pointing signals steering said gimballed mirror to said target establish and then maintain said line of sight to said target;

said gimballed mirror receiving image forming light from said target and then directing a first beam of said image forming light along a first light path;

a first turning mirror positioned on said first light path to receive the first beam of said image forming light from said gimballed mirror, said first turning mirror directing a second beam of said image forming light along a second light path;

a first video camera positioned on said second light path to receive the second beam of said image forming light, said first video camera responsive to the second beam of said image forming light received from said first turning mirror generating a first video signal;

a first video monitor connected to said first video camera to receive said first video signal, said first video monitor responsive to said first video signal displaying a wide field of view scene including said target, said first video monitor being positioned within said aircraft to allow said observer to monitor said target when said observer is using said track handle to track said target;

a second turning mirror positioned on said first light path downstream from said first turning mirror, said second turning mirror receiving the first beam of said image forming light from said gimballed mirror, said second turning mirror directing a third beam of said image forming light along a third light path;

a zoom telescope positioned on said third light path to receive the third beam of said image forming light, said zoom telescope modifying the third beam of said image forming light to define a narrow field of view scene;

a second video camera positioned downstream from said zoom telescope on said third light path to receive the third beam said image forming light from zoom telescope, said second video camera responsive to the third beam of said image forming light received from said zoom telescope generating a second video signal;

an aircraft inertial navigation system connected to said computer, said aircraft inertial navigation system generating digital aircraft positional signals indicative of latitude, longitude and altitude for said aircraft and roll, pitch and heading for said aircraft, said aircraft inertial navigation system providing said digital aircraft positional signals to said computer;

said gimbal interface generating gimbal angular position signals indicative of azimuth and elevation line of sight angles for said gimballed mirror when said gimballed mirror is tracking said target, said gimbal interface providing said gimbal angular position signals to said computer;

said computer, responsive to said digital aircraft positional signals and said gimbal angular position signals, calculating a latitude, a longitude and an altitude for said target;

said computer being connected to said second video camera to receive said second video signal, said computer processing said second video signal to overlay the latitude, the longitude and the altitude of said target on said second video signal;

a second video monitor connected to said computer to receive said second video signal, said second video monitor responsive to said second video signal displaying said narrow field of view scene, said narrow field of view scene having said target displayed therein whenever said gimballed mirror is aligned with said line of sight to said target, said narrow field of view scene including the latitude, the longitude and the altitude of said target, said second video monitor being positioned within said aircraft to allow said observer to monitor said target when said observer is using said track handle to track said target;

said computer containing a keyboard.c computer software module, said keyboard.c computer software module automatically calibrating said gimbal angular pointing signals and said gimbal angular position signals;

a keyboard coupled to said computer, said keyboard having a plurality of alpha-numeric and function keys;

a third video monitor coupled to said computer, said third video monitor being positioned to allow said observer to monitor said third video monitor, said third video monitor displaying a plurality of calibration menus, each of said plurality of calibration menus having a set of calibration instructions, a first of said plurality of calibration menus being associated with calibrating said gimbal angular position signals and a second of said plurality of calibration menus being associated with calibrating said gimbal angular pointing signals;

the alpha-numeric and function keys of said keyboard first being used by said observer to access the set of calibration instructions for the first of said plurality of calibration menus, the alpha-numeric and function keys of said keyboard then being used by said observer to implement the set of calibration instructions for the first of said plurality of calibration menus, said keyboard.c computer software module being activated to automatically calibrate said gimbal angular position signals when said observer implements the set of calibration instructions for the first of said plurality of calibration menus;

the alpha-numeric and function keys of said keyboard next being used by said observer to access the set of calibration instructions for the second of said plurality of calibration menus, the alpha-numeric and function keys of said keyboard then being used by said observer to implement the set of calibration instructions for the second of said plurality of calibration menus, said keyboard.c computer software module being activated to automatically calibrate said gimbal angular pointing signals when said observer implements the set of calibration instructions for the second of said plurality of calibration menus;

an infrared display system positioned within said aircraft, said infrared display system being adapted to track said target, said infrared display system providing synchro signals indicative of azimuth and elevation sight angles for said infrared display system when said infrared display system is tracking said target;

said infrared display system being coupled to said computer to provide said synchro signals to said computer;

said third video monitor displaying a third of said plurality of calibration menus, the third of said plurality of calibration menus being associated with calibrating said synchro signals;

the alpha-numeric and function keys of said keyboard being used by said observer to access the set of calibration instructions for the third of said plurality of calibration menus, the alpha-numeric and function keys of said keyboard then being used by said observer to implement the set of calibration instructions for the third of said plurality of calibration menus, said keyboard.c computer software module being activated to automatically calibrate said synchro signals when said observer implements the set of calibration instructions for the third of said plurality of calibration menus;

a remote computer coupled to said computer, said remote computer being adapted to control operation of said infrared display system, said remote computer providing a command to said computer allowing said remote computer to control operation of said infrared display system; and a moving map display coupled to said computer, said moving map display being positioned on board said aircraft, said computer providing a location for said target to said moving map display, the location for said target being displayed on said moving map display.

9. The airborne video tracking system of claim 8 wherein said gimballed mirror comprises an approximately four inch mirror fabricated from beryllium, said gimballed mirror having a flatness of about lambda over ten.

10. The airborne video tracking system of claim 8 wherein said first turning mirror comprises a one inch turning mirror having a flatness of about lambda over ten.

11. The airborne video tracking system of claim 8 wherein said second turning mirror comprises a four inch turning mirror having a flatness of about lambda over ten.

12. The airborne video tracking system of claim 8 wherein said zoom telescope modifies said image forming light to provide a range from about 0.1 degree to about one degree for said narrow field of view scene.

13. The airborne video tracking system of claim 8 further comprising:

a first video recorder connected to said first video camera to receive said first video signal and record said first video signal; and a second video recorder connected to said second video camera to receive said second video signal and record said second video signal.

14. The airborne video tracking system of claim 8 wherein said computer contains a cuepoint data software file, said cuepoint data software file having a plurality of target locations stored therein, said operator accessing each of said plurality of target locations by using the alpha-numeric and function keys of said keyboard, the alpha-numeric and function keys of said keyboard allowing said operator to use a selected one of said plurality of target locations as an active pointing device to point said gimballed mirror at the selected one of said plurality of target locations.

15. An airborne video tracking system for establishing and maintaining a line of sight to a target, said airborne video tracking system being mounted within an aircraft, said airborne video tracking system comprising:

an acquisition sight positioned within said aircraft, said acquisition sight allowing a pilot of said aircraft to acquire and begin tracking said target, said acquisition sight having a newton ring, said target being acquired when said pilot observes said target within the newton ring of said acquisition sight, said acquisition sight providing first analog position signals indicative of azimuth and elevation sight angles for said acquisition sight when said acquisition sight is tracking said target;

a track handle positioned within said aircraft, said track handle having a trigger switch, said track handle allowing an observer within said aircraft to take control of tracking said target from said pilot when said observer activates said trigger switch, said track handle providing second analog position signals indicative of azimuth and elevation sight angles for said track handle when said track handle is tracking said target;

a computer connected to said acquisition sight to receive said first analog position signals from said acquisition sight and said track handle to receive said second analog position signals from said track handle, said computer processing said first analog position signals and said second analog position signals to generate gimbal angular pointing signals;

a gimballed mirror having a gimbal interface, said gimbal interface being connected to said computer to receive said gimbal angular pointing signals from said computer, said gimbal interface responsive to said gimbal angular pointing signals steering said gimballed mirror to said target to establish and then maintain said line of sight to said target;

said gimballed mirror receiving image forming light from said target and then directing a first beam of said image forming light along a first light path;

a first turning mirror positioned on said first light path to receive the first beam of said image forming light from said gimballed mirror, said first turning mirror directing a second beam of said image forming light along a second light path;

a first video camera positioned on said second light path to receive the second beam of said image forming light, said first video camera responsive to the second beam of said image forming light received from said first turning mirror generating a first video signal;

a first video monitor connected to said first video camera to receive said first video signal, said first video monitor responsive to said first video signal displaying a wide field of view scene including said target, said first video monitor being positioned within said aircraft to allow said observer to monitor said target when said observer is using said track handle to track said target;

a second turning mirror positioned on said first light path downstream from said first turning mirror, said second turning mirror receiving the first beam of said image forming light from said gimballed mirror, said second turning mirror directing a third beam of said image forming light along a third light path;

a zoom telescope positioned on said third light path to receive the third beam of said image forming light, said zoom telescope modifying the third beam of said image forming light to define a narrow field of view scene;

a second video camera positioned downstream from said zoom telescope on said third light path to receive the third beam of said image forming light from zoom telescope, said second video camera responsive to the third beam of said image forming light received from said zoom telescope generating a second video signal;

an aircraft inertial navigation system connected to said computer, said aircraft inertial navigation system generating digital aircraft position signals indicative of latitude, longitude and altitude for said aircraft and roll, pitch and heading for said aircraft, said aircraft inertial navigation system providing said digital aircraft position signals to said computer;

said gimbal interface generating gimbal angular position signals indicative of azimuth and elevation line of sight angles for said gimballed mirror when said gimballed mirror is tracking said target, said gimbal interface providing said gimbal angular position signals to said computer;

said computer, responsive to said digital aircraft positional signals and said gimbal angular position signals, calculating a latitude, a longitude and an altitude for said target;

said computer being connected to said second video camera to receive said second video signal, said computer processing said second video signal to overlay the latitude, the longitude and the altitude of said target on said second video signal;

a second video monitor connected to said computer to receive said second video signal, said second video monitor responsive to said second video signal displaying said narrow field of view scene, said narrow field of view scene having said target displayed therein whenever said gimballed mirror is aligned with said line of sight to said target, said narrow field of view scene including the latitude, the longitude and the altitude of said target, said second video monitor being positioned within said aircraft to allow said observer to monitor said target when said observer is using said track handle to track said target;

an automatic video tracker positioned within said aircraft, said automatic video tracker beginning to track said target when said target is within said narrow field of view scene and said observer switches control of tracking said target from said track handle to said automatic video tracker, said automatic video tracker providing third analog position signals indicative of azimuth and elevation sight angles for said automatic video tracker when said automatic video tracker is tracking said target;

said computer being connected to said automatic video tracker to receive said third analog position signals, said computer processing said third analog position signals to generate said gimbal angular pointing signals;

said computer containing a keyboard.c computer software module, said keyboard.c computer software module automatically calibrating said first analog position signals, said gimbal angular pointing signals and said gimbal angular position signals;

a keyboard coupled to said computer, said keyboard having a plurality of alpha-numeric and function keys;

a third video monitor coupled to said computer, said third video monitor being positioned to allow said observer to monitor said third video monitor, said third video monitor displaying a plurality of calibration menus, each of said plurality of calibration menus having a set of calibration instructions, a first of said plurality of calibration menus being associated with calibrating said gimbal angular position signals, a second of said plurality of calibration menus being associated with calibrating said gimbal angular pointing signals and a third of said plurality of calibration menus being associated with calibrating said first analog position signals;

the alpha-numeric and function keys of said keyboard first being used by said observer to access the set of calibration instructions for the first of said plurality of calibration menus, the alpha-numeric and function keys of said keyboard then being used by said observer to implement the set of calibration instructions for the first of said plurality of calibration menus, said keyboard.c computer software module being activated to automatically calibrate said gimbal angular position signals when said observer implements the set of calibration instructions for the first of said plurality of calibration menus;

the alpha-numeric and function keys of said keyboard secondly being used by said observer to access the set of calibration instructions for the second of said plurality of calibration menus, the alpha-numeric and function keys of said keyboard then being used by said observer to implement the set of calibration instructions for the second of said plurality of calibration menus, said keyboard.c computer software module being activated to automatically calibrate said gimbal angular pointing signals when said observer implements the set of calibration instructions for the second of said plurality of calibration menus;

the alpha-numeric and function keys of said keyboard being used by said observer to access the set of calibration instructions for the third of said plurality of calibration menus, the alpha-numeric and function keys of said keyboard then being used by said observer to implement the set of calibration instructions for the third of said plurality of calibration menus, said keyboard.c computer software module being activated to automatically calibrate said first analog position signals when said observer implements the set of calibration instructions for the third of said plurality of calibration menus;

an infrared display system positioned within said aircraft, said infrared display system being adapted to track said target, said infrared display system providing synchro signals indicative of azimuth and elevation sight angles for said infrared display system when said infrared display system is tracking said target;

said infrared display system being coupled to said computer to provide said synchro signals to said computer;

said third video monitor displaying a fourth of said plurality of calibration menus, the fourth of said plurality of calibration menus being associated with calibrating said synchro signals;

the alpha-numeric and function keys of said keyboard being used by said observer to access the set of calibration instructions for the fourth of said plurality of calibration menus, the alpha-numeric and function keys of said keyboard then being used by said observer to implement the set of calibration instructions for the fourth of said plurality of calibration menus, said keyboard.c computer software module being activated to automatically calibrate said synchro signals when said observer implements the set of calibration instructions for the fourth of said plurality of calibration menus;

a remote computer coupled to said computer, said remote computer being adapted to control operation of said infrared display system, said remote computer providing a command to said computer allowing said remote computer to control operation of said infrared display system; and a moving map display coupled to said computer, said moving map display being positioned on board said aircraft, said computer providing a location for said target to said moving map display, the location for said target being displayed on said moving map display.

16. The airborne video tracking system of claim 15 wherein said gimballed mirror comprises an approximately four inch mirror fabricated from beryllium, said gimballed mirror having a flatness of about lambda over ten.

17. The airborne video tracking system of claim 15 wherein said first turning mirror comprises a one inch turning mirror having a flatness of about lambda over ten.

18. The airborne video tracking system of claim 15 wherein said second turning mirror comprises a four inch turning mirror having a flatness of about lambda over ten.

19. The airborne video tracking system of claim 15 wherein said zoom telescope modifies said image forming light to provide a range from about 0.1 degree to about one degree for said narrow field of view scene.

20. The airborne video tracking system of claim 15 further comprising:

a first video recorder connected to said first video camera to receive said first video signal and record said first video signal; and a second video recorder connected to said second video camera to receive said second video signal and record said second video signal.

21. The airborne video tracking system of claim 15 further comprising:

a flip mirror positioned on said third light path between said zoom telescope and said second video camera, said flip mirror directing the third beam said image forming light from zoom telescope to said second video camera; and a third video camera positioned downstream from said flip mirror on a fourth light path;

said flip mirror rotatable by ninety degrees, and able to direct the third beam of said image forming light to said third video camera;

said third video camera responsive to the third beam of said image forming light received from said flip mirror generating a third video signal;

said third video camera being connected to said computer to provide said third video signal to said computer.

22. The airborne video tracking system of claim 15 wherein said computer contains a cuepoint data software file, said cuepoint data software file having a plurality of target locations stored therein, said operator accessing each of said plurality of target locations by using the alphanumeric and function keys of said keyboard, the alphanumeric and function keys of said keyboard allowing said operator to use a selected one of said plurality of target locations as an active pointing device to point said gimballed mirror at the selected one of said plurality of target locations.

* * * * *